United States Patent
Strugar et al.

(10) Patent No.: US 9,959,590 B2
(45) Date of Patent: May 1, 2018

(54) SYSTEM AND METHOD OF CACHING FOR PIXEL SYNCHRONIZATION-BASED GRAPHICS TECHNIQUES

(71) Applicant: Intel Corporation, Santa Clara, CA (US)

(72) Inventors: Filip Strugar, Leamington Spa (GB); Axel Mamode, Plaisance du Touch (FR)

(73) Assignee: Intel Corporation, Santa Clara, CA (US)

( * ) Notice: Subject to any disclaimer, the term of this patent is extended or adjusted under 35 U.S.C. 154(b) by 0 days. days.

(21) Appl. No.: 15/084,803

(22) Filed: Mar. 30, 2016

(65) Prior Publication Data

US 2017/0287098 A1  Oct. 5, 2017

(51) Int. Cl.
*G06T 1/20* (2006.01)
*G06T 15/00* (2011.01)
*G06T 15/80* (2011.01)
*G06T 15/40* (2011.01)
*G06T 1/60* (2006.01)

(52) U.S. Cl.
CPC ............... *G06T 1/20* (2013.01); *G06T 1/60* (2013.01); *G06T 15/005* (2013.01); *G06T 15/40* (2013.01); *G06T 15/80* (2013.01)

(58) Field of Classification Search
None
See application file for complete search history.

(56) References Cited

U.S. PATENT DOCUMENTS

| 8,223,148 B1 * | 7/2012 | Carr | G06T 15/06 345/426 |
| 8,269,769 B1 * | 9/2012 | Voorhies | G06T 15/40 345/422 |
| 8,797,323 B2 | 8/2014 | Salvi et al. | |

(Continued)

FOREIGN PATENT DOCUMENTS

| WO | WO 2012-096789 A1 | 7/2012 |
| WO | 2017172032 A1 | 10/2017 |

OTHER PUBLICATIONS

PCT International Search Report and The Written Opinion Of the International Searching Authority for PCT/US2017/016062 dated May 10, 2017, 11 pages.

(Continued)

*Primary Examiner* — Martin Mushambo
(74) *Attorney, Agent, or Firm* — Alpine Technology Law Group LLC

(57) ABSTRACT

Embodiment described herein combines a caching system with special cache flushing methods aimed at reducing thread divergence across a group of threads in a thread group, in order to synchronize branching paths taken by different threads executing on the same graphics processor execution unit, One embodiment provides for a graphics processing apparatus comprising graphics execution logic to execute one or more threads of a graphics shader program; an occluder cache to store input occluder node data for adaptive graphical effects logic of the graphics shader program; and compression logic to compress input occluder node data stored in the occluder cache. The occluder node data, in one embodiment, includes occlusion data for use with adaptive shadowing or transparency logic.

20 Claims, 21 Drawing Sheets

(56) References Cited

U.S. PATENT DOCUMENTS

| | | |
|---|---|---|
| 9,153,201 B2 | 10/2015 | Salvi |
| 9,491,490 B1 * | 11/2016 | Toth ..................... H04N 19/115 |
| 2006/0038822 A1 | 2/2006 | Xu et al. |
| 2014/0098096 A1 | 4/2014 | Bavoil |
| 2015/0170406 A1 | 6/2015 | Yu et al. |
| 2016/0086299 A1 | 3/2016 | Sharma et al. |

OTHER PUBLICATIONS

Rasterizer Order Views 101: a Primer, Intel Corporation, Aug. 5, 2015, 10 pages.

* cited by examiner

FIG. 9A GRAPHICS PROCESSOR COMMAND FORMAT
900
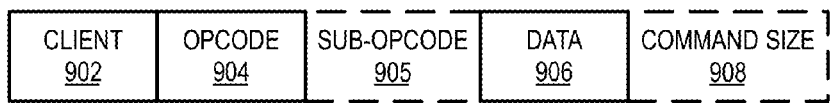
FIG. 9B GRAPHICS PROCESSOR COMMAND SEQUENCE
910
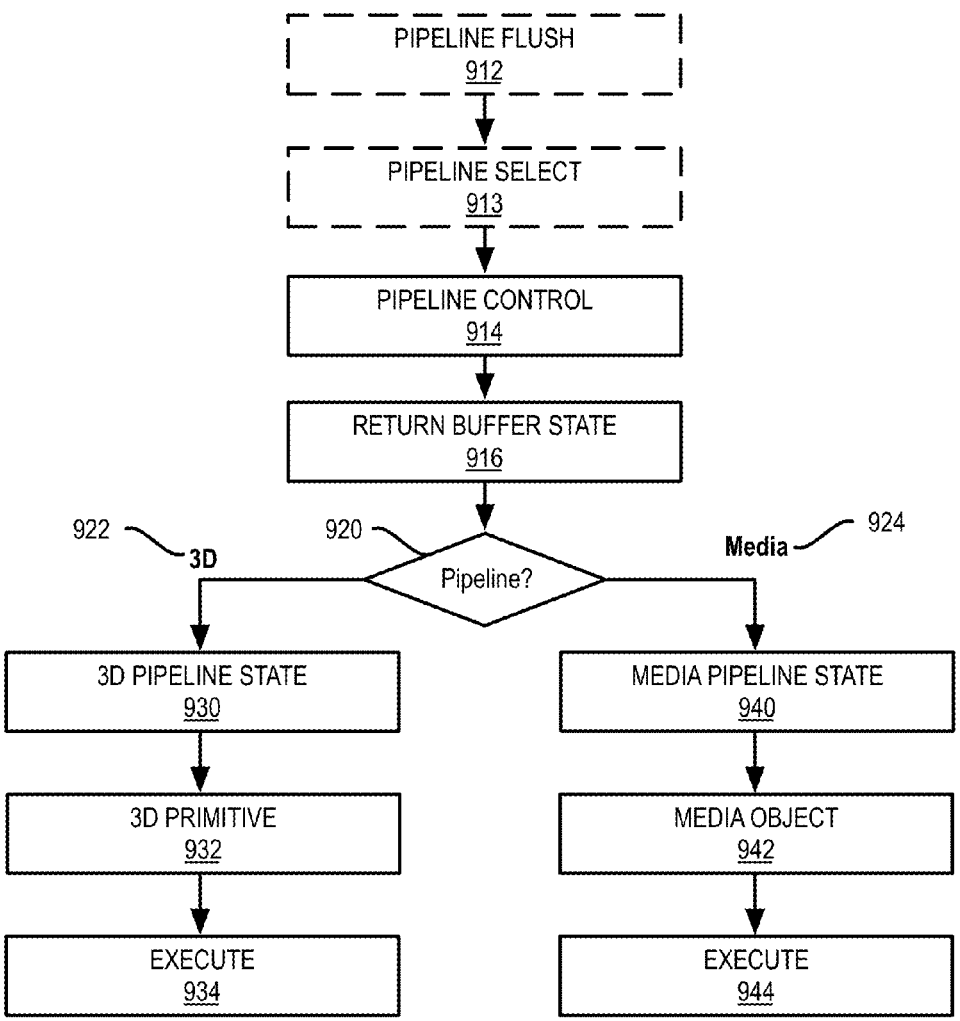

ADAPTIVE VOLUMETRIC SHADOW MAPPING NODE COMPRESSION
1500

ADAPTIVE TRANSPARENCY NODE COMPRESSION
1600

CACHE FLUSH BILLBOARD - 1900

SYSTEM AND METHOD OF CACHING FOR PIXEL SYNCHRONIZATION-BASED GRAPHICS TECHNIQUES

TECHNICAL FIELD

Embodiments generally relate to graphics rendering logic. More particularly, embodiments relate to a cache for pixel synchronization based graphics processing techniques.

BACKGROUND

Graphics processor hardware support for pixel synchronization has enabled a new class of graphics processor algorithms that can employ custom per-pixel computation that is dependent on being executed in precise triangle input order. Adaptive Volumetric Shadow Maps (AVSM) and Order Independent Transparency (OIT) are examples of features that can make use of pixel synchronization. For example, AVSM can be used to provide shadowing and self-shadowing effects for dynamic volumetric media such as hair and smoke. Pixel synchronization support enables the implementation of a raster order view (ROV) version of the AVSM algorithm that is practical for real time use in graphically intensive applications.

However, the ROV-enabled AVSM algorithm has a high memory bandwidth and computation cost. The entire per-pixel data set is loaded, decoded, compressed, encoded and stored for each new node (e.g., partial occluder) insertion. Representative workloads may use more than 100 insertions per texture element, per frame. Such overhead can have the result of limiting the visual quality level that is possible at an acceptable graphic processor execution cost.

BRIEF DESCRIPTION OF THE DRAWINGS

The various advantages of the embodiments will become apparent to one skilled in the art by reading the following specification and appended claims, and by referencing the following drawings, in which:

FIG. 9A is a block diagram illustrating a graphics processor command format according to an embodiment;

FIG. 9B is a block diagram illustrating a graphics processor command sequence according to an embodiment;

DESCRIPTION OF EMBODIMENTS

Figure 1:
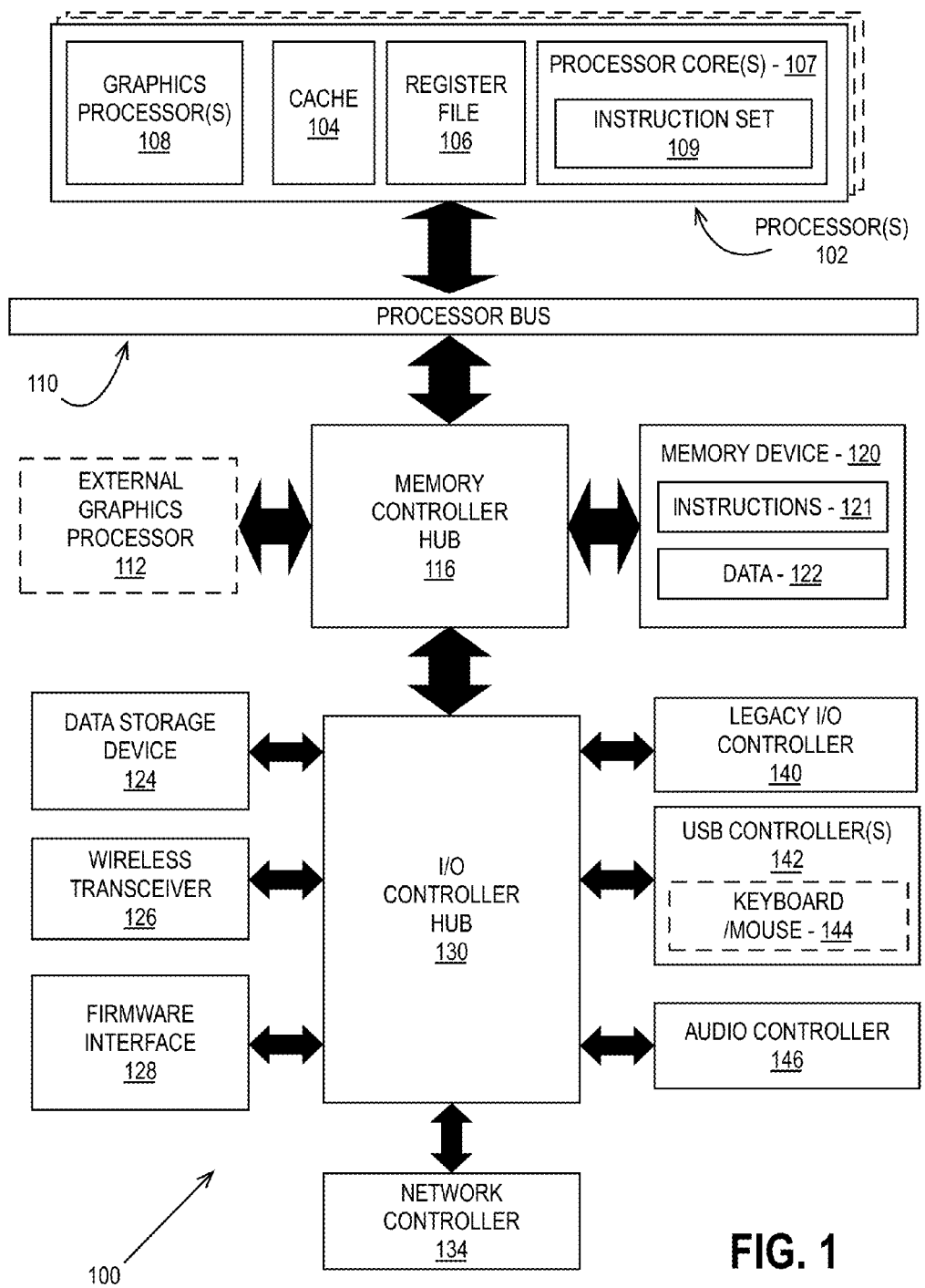
FIG. 1 is a block diagram of an embodiment of a computer system with a processor having one or more processor cores and graphics processors.

Embodiment described herein combines a caching system with special cache flushing methods aimed at reducing thread divergence across a group of threads in a thread group, in order to synchronize branching paths taken by different threads executing on the same graphics processor execution unit (EU). Embodiments are applicable to and can be demonstrated with modified AVSM and OIT algorithms.

In the example of the AVSM algorithm, the AVSM algorithm known in the art stores representation of the transmittance curve in the form of 32-bit nodes in which a depth location along the light ray and a current transmittance at that depth are encoded. The process for inserting a single new node (occluder) using a Pixel Shader is as follows: the dataset of nodes (e.g., 4. 6, 8, 16, etc., depending on quality) is loaded into shader registers using unordered access views (UAVs); a new occluder is added, transmittance values are recalculated, and the least important node is removed (e.g., lossy compression); and the dataset is then stored back using UAVs.

The hybrid solution provided by embodiments described herein stores new occluders into a separate cache. An example cache includes a 2D, 32-bit counter texture and a 3D node cache with 16 to 128 nodes per texel. Once the cache is full, the classic AVSM algorithm is applied for all nodes in the cache during a cache flush operation. The algorithm is applied at the same time for all nodes in the cache and, in one embodiment is applied in parallel using multi-threaded logic. Using the provided techniques, the entire dataset is loaded and stored only once per cache flush, which reduces bandwidth requirements. Additionally the compression algorithm can work on more than one node insertion at a time, allowing for a number of optimizations and improvements.

For the purposes of explanation, numerous specific details are set forth to provide a thorough understanding of the various embodiments described below. However, it will be apparent to a skilled practitioner in the art that the embodiments may be practiced without some of these specific details. In other instances, well-known structures and devices are shown in block diagram form to avoid obscuring the underlying principles, and to provide a more thorough understanding of embodiments. Although some of the following embodiments are described with reference to a graphics processor, the techniques and teachings described herein may be applied to various types of circuits or semiconductor devices, including general purpose processing devices or graphic processing devices. Reference herein to "one embodiment" or "an embodiment" indicate that a particular feature, structure, or characteristic described in connection or association with the embodiment can be included in at least one of such embodiments. However, the appearances of the phrase "in one embodiment" in various places in the specification do not necessarily all refer to the same embodiment.

In the following description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other.

In the description that follows, FIGS. 1-12 provide an overview of exemplary data processing system and graphics processor logic that incorporates or relates to the various embodiments. FIGS. 13-21 provide specific details of the various embodiments. Although some of the following embodiments are described with reference to a graphics processor, similar techniques and teachings can be applied to other types of circuits or semiconductor devices, including general purpose processors or many integrated core processors, as the teachings are applicable to any processor or machine that manipulates or processes image or vertex data.

System Overview

FIG. 1 is a block diagram of a processing system 100, according to an embodiment. In various embodiments the system 100 includes one or more processors 102 and one or more graphics processors 108, and may be a single processor desktop system, a multiprocessor workstation system, or a server system having a large number of processors 102 or processor cores 107. In on embodiment, the system 100 is a processing platform incorporated within a system-on-a-chip (SoC) integrated circuit for use in mobile, handheld, or embedded devices.

An embodiment of system 100 can include, or be incorporated within a server-based gaming platform, a game console, including a game and media console, a mobile gaming console, a handheld game console, or an online game console. In some embodiments system 100 is a mobile phone, smart phone, tablet computing device or mobile Internet device. Data processing system 100 can also include, couple with, or be integrated within a wearable device, such as a smart watch wearable device, smart eyewear device, augmented reality device, or virtual reality device. In some embodiments, data processing system 100 is a television or set top box device having one or more processors 102 and a graphical interface generated by one or more graphics processors 108.

In some embodiments, the one or more processors 102 each include one or more processor cores 107 to process instructions which, when executed, perform operations for system and user software. In some embodiments, each of the one or more processor cores 107 is configured to process a specific instruction set 109. In some embodiments, instruction set 109 may facilitate Complex Instruction Set Computing (CISC), Reduced Instruction Set Computing (RISC), or computing via a Very Long Instruction Word (VLIW). Multiple processor cores 107 may each process a different instruction set 109, which may include instructions to facilitate the emulation of other instruction sets. Processor core 107 may also include other processing devices, such a Digital Signal Processor (DSP).

In some embodiments, the processor 102 includes cache memory 104. Depending on the architecture, the processor 102 can have a single internal cache or multiple levels of internal cache. In some embodiments, the cache memory is shared among various components of the processor 102. In some embodiments, the processor 102 also uses an external cache (e.g., a Level-3 (L3) cache or Last Level Cache (LLC)) (not shown), which may be shared among processor cores 107 using known cache coherency techniques. A register file 106 is additionally included in processor 102 which may include different types of registers for storing different types of data (e.g., integer registers, floating point registers, status registers, and an instruction pointer register). Some registers may be general-purpose registers, while other registers may be specific to the design of the processor 102.

In some embodiments, processor 102 is coupled to a processor bus 110 to transmit communication signals such as address, data, or control signals between processor 102 and other components in system 100. In one embodiment the system 100 uses an exemplary 'hub' system architecture, including a memory controller hub 116 and an Input Output (I/O) controller hub 130. A memory controller hub 116 facilitates communication between a memory device and other components of system 100, while an I/O Controller Hub (ICH) 130 provides connections to I/O devices via a local I/O bus. In one embodiment, the logic of the memory controller hub 116 is integrated within the processor.

Memory device 120 can be a dynamic random access memory (DRAM) device, a static random access memory (SRAM) device, flash memory device, phase-change memory device, or some other memory device having suitable performance to serve as process memory. In one embodiment the memory device 120 can operate as system memory for the system 100, to store data 122 and instructions 121 for use when the one or more processors 102 executes an application or process. Memory controller hub 116 also couples with an optional external graphics processor 112, which may communicate with the one or more graphics processors 108 in processors 102 to perform graphics and media operations.

In some embodiments, ICH 130 enables peripherals to connect to memory device 120 and processor 102 via a high-speed I/O bus. The I/O peripherals include, but are not limited to, an audio controller 146, a firmware interface 128, a wireless transceiver 126 (e.g., Wi-Fi, Bluetooth), a data storage device 124 (e.g., hard disk drive, flash memory, etc.), and a legacy I/O controller 140 for coupling legacy (e.g., Personal System 2 (PS/2)) devices to the system. One or more Universal Serial Bus (USB) controllers 142 connect input devices, such as keyboard and mouse 144 combinations. A network controller 134 may also couple to ICH 130. In some embodiments, a high-performance network controller (not shown) couples to processor bus 110. It will be appreciated that the system 100 shown is exemplary and not limiting, as other types of data processing systems that are differently configured may also be used. For example, the I/O controller hub 130 may be integrated within the one or more processor 102, or the memory controller hub 116 and I/O controller hub 130 may be integrated into a discreet external graphics processor, such as the external graphics processor 112.

Figure 2:
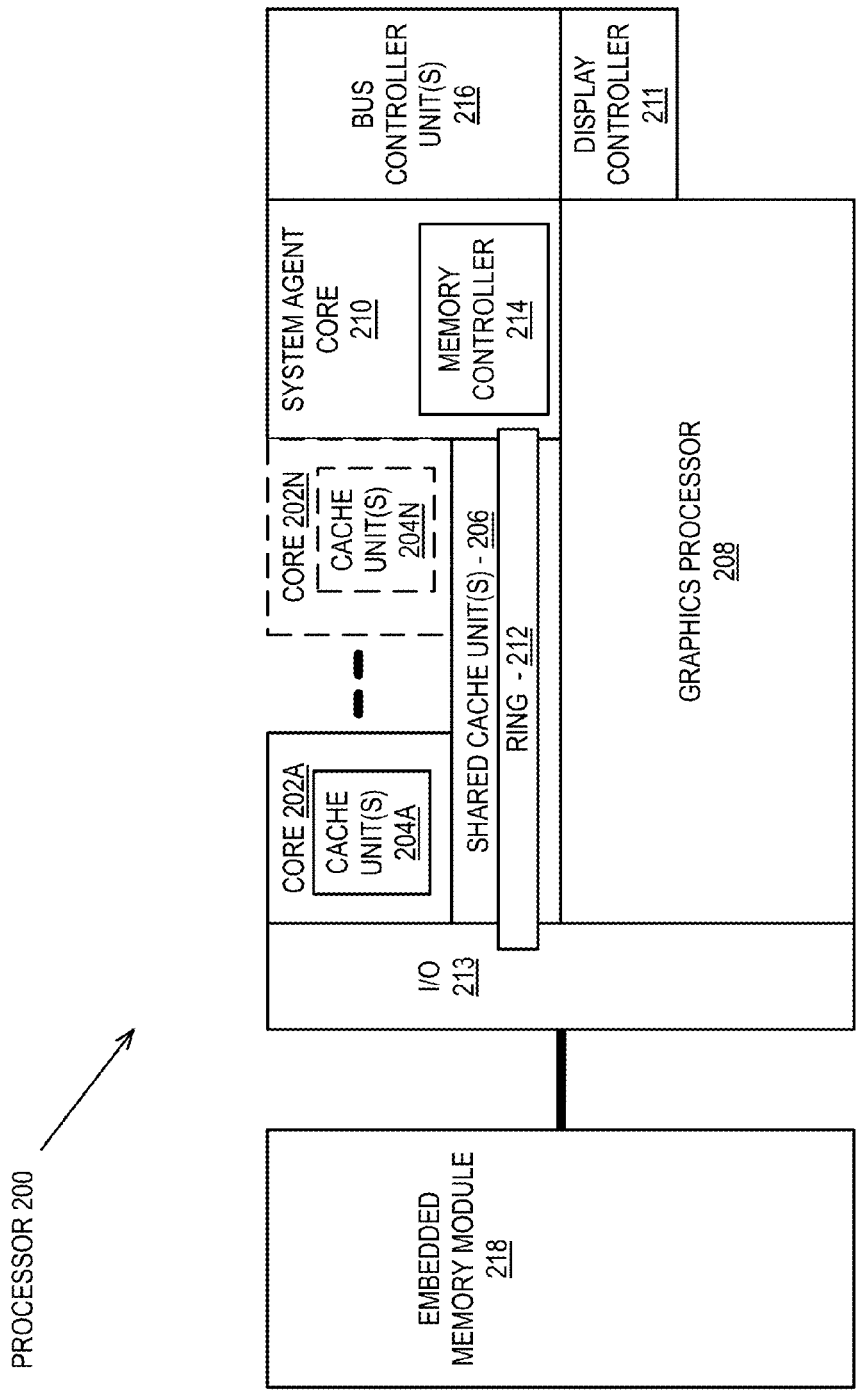
FIG. 2 is a block diagram of one embodiment of a processor having one or more processor cores, an integrated memory controller, and an integrated graphics processor.

FIG. 2 is a block diagram of an embodiment of a processor 200 having one or more processor cores 202A-202N, an integrated memory controller 214, and an integrated graphics processor 208. Those elements of FIG. 2 having the same reference numbers (or names) as the elements of any other figure herein can operate or function in any manner similar to that described elsewhere herein, but are not limited to such. Processor 200 can include additional cores up to and including additional core 202N represented by the dashed lined boxes. Each of processor cores 202A-202N includes one or more internal cache units 204A-204N. In some embodiments each processor core also has access to one or more shared cached units 206.

The internal cache units 204A-204N and shared cache units 206 represent a cache memory hierarchy within the processor 200. The cache memory hierarchy may include at least one level of instruction and data cache within each processor core and one or more levels of shared mid-level cache, such as a Level 2 (L2), Level 3 (L3), Level 4 (L4), or other levels of cache, where the highest level of cache before external memory is classified as the LLC. In some embodiments, cache coherency logic maintains coherency between the various cache units 206 and 204A-204N.

In some embodiments, processor 200 may also include a set of one or more bus controller units 216 and a system agent core 210. The one or more bus controller units 216 manage a set of peripheral buses, such as one or more Peripheral Component Interconnect buses (e.g., PCI, PCI Express). System agent core 210 provides management functionality for the various processor components. In some embodiments, system agent core 210 includes one or more integrated memory controllers 214 to manage access to various external memory devices (not shown).

In some embodiments, one or more of the processor cores 202A-202N include support for simultaneous multi-threading. In such embodiment, the system agent core 210 includes components for coordinating and operating cores 202A-202N during multi-threaded processing. System agent core 210 may additionally include a power control unit (PCU), which includes logic and components to regulate the power state of processor cores 202A-202N and graphics processor 208.

In some embodiments, processor 200 additionally includes graphics processor 208 to execute graphics processing operations. In some embodiments, the graphics processor 208 couples with the set of shared cache units 206, and the system agent core 210, including the one or more integrated memory controllers 214. In some embodiments, a display controller 211 is coupled with the graphics processor 208 to drive graphics processor output to one or more coupled displays. In some embodiments, display controller 211 may be a separate module coupled with the graphics processor via at least one interconnect, or may be integrated within the graphics processor 208 or system agent core 210.

In some embodiments, a ring based interconnect unit 212 is used to couple the internal components of the processor 200. However, an alternative interconnect unit may be used, such as a point-to-point interconnect, a switched interconnect, or other techniques, including techniques well known in the art. In some embodiments, graphics processor 208 couples with the ring interconnect 212 via an I/O link 213.

The exemplary I/O link 213 represents at least one of multiple varieties of I/O interconnects, including an on package I/O interconnect which facilitates communication between various processor components and a high-performance embedded memory module 218, such as an eDRAM module. In some embodiments, each of the processor cores 202-202N and graphics processor 208 use embedded memory modules 218 as a shared Last Level Cache.

In some embodiments, processor cores 202A-202N are homogenous cores executing the same instruction set architecture. In another embodiment, processor cores 202A-202N are heterogeneous in terms of instruction set architecture (ISA), where one or more of processor cores 202A-N execute a first instruction set, while at least one of the other cores executes a subset of the first instruction set or a different instruction set. In one embodiment processor cores 202A-202N are heterogeneous in terms of microarchitecture, where one or more cores having a relatively higher power consumption couple with one or more power cores having a lower power consumption. Additionally, processor 200 can be implemented on one or more chips or as an SoC integrated circuit having the illustrated components, in addition to other components.

Figure 3:
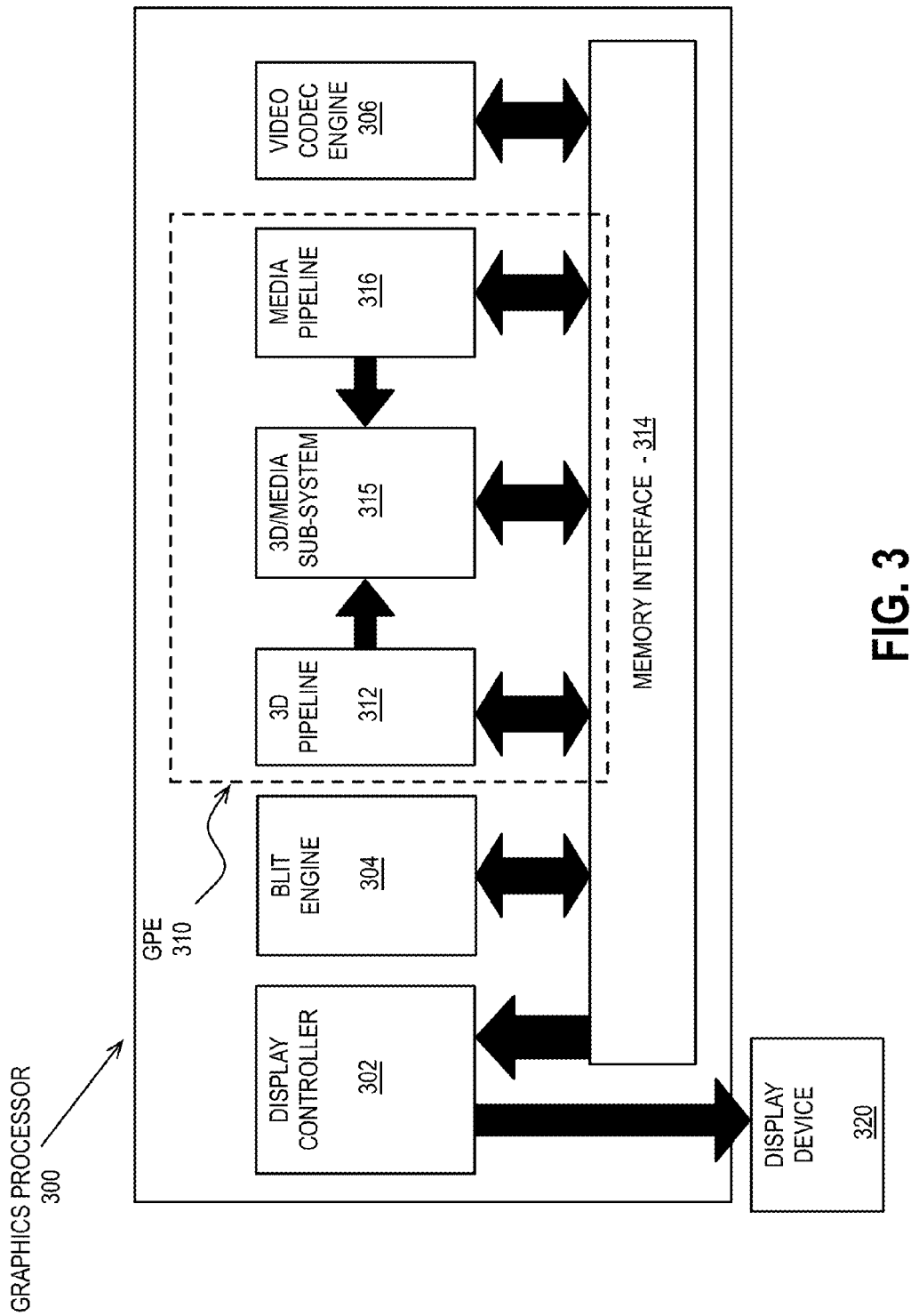
FIG. 3 is a block diagram of one embodiment of a graphics processor which may be a discreet graphics processing unit, or may be graphics processor integrated with a plurality of processing cores.

FIG. 3 is a block diagram of a graphics processor 300, which may be a discrete graphics processing unit, or may be a graphics processor integrated with a plurality of processing cores. In some embodiments, the graphics processor communicates via a memory mapped I/O interface to registers on the graphics processor and with commands placed into the processor memory. In some embodiments, graphics processor 300 includes a memory interface 314 to access memory. Memory interface 314 can be an interface to local memory, one or more internal caches, one or more shared external caches, and/or to system memory.

In some embodiments, graphics processor 300 also includes a display controller 302 to drive display output data to a display device 320. Display controller 302 includes hardware for one or more overlay planes for the display and composition of multiple layers of video or user interface elements. In some embodiments, graphics processor 300 includes a video codec engine 306 to encode, decode, or transcode media to, from, or between one or more media encoding formats, including, but not limited to Moving Picture Experts Group (MPEG) formats such as MPEG-2, Advanced Video Coding (AVC) formats such as H.264/MPEG-4 AVC, as well as the Society of Motion Picture & Television Engineers (SMPTE) 421 M/VC-1, and Joint Photographic Experts Group (JPEG) formats such as JPEG, and Motion JPEG (MJPEG) formats.

In some embodiments, graphics processor 300 includes a block image transfer (BLIT) engine 304 to perform two-dimensional (2D) rasterizer operations including, for example, bit-boundary block transfers. However, in one embodiment, 2D graphics operations are performed using one or more components of graphics processing engine (GPE) 310. In some embodiments, graphics processing engine 310 is a compute engine for performing graphics operations, including three-dimensional (3D) graphics operations and media operations.

In some embodiments, GPE 310 includes a 3D pipeline 312 for performing 3D operations, such as rendering three-dimensional images and scenes using processing functions that act upon 3D primitive shapes (e.g., rectangle, triangle, etc.). The 3D pipeline 312 includes programmable and fixed function elements that perform various tasks within the element and/or spawn execution threads to a 3D/Media sub-system 315. While 3D pipeline 312 can be used to perform media operations, an embodiment of GPE 310 also includes a media pipeline 316 that is specifically used to perform media operations, such as video post-processing and image enhancement.

In some embodiments, media pipeline 316 includes fixed function or programmable logic units to perform one or more specialized media operations, such as video decode acceleration, video de-interlacing, and video encode acceleration in place of, or on behalf of video codec engine 306. In some embodiments, media pipeline 316 additionally includes a thread spawning unit to spawn threads for execution on 3D/Media sub-system 315. The spawned threads perform computations for the media operations on one or more graphics execution units included in 3D/Media sub-system 315.

In some embodiments, 3D/Media subsystem 315 includes logic for executing threads spawned by 3D pipeline 312 and media pipeline 316. In one embodiment, the pipelines send thread execution requests to 3D/Media subsystem 315, which includes thread dispatch logic for arbitrating and dispatching the various requests to available thread execution resources. The execution resources include an array of graphics execution units to process the 3D and media threads. In some embodiments, 3D/Media subsystem 315 includes one or more internal caches for thread instructions and data. In some embodiments, the subsystem also includes shared memory, including registers and addressable memory, to share data between threads and to store output data.

3D/Media Processing

Figure 4:
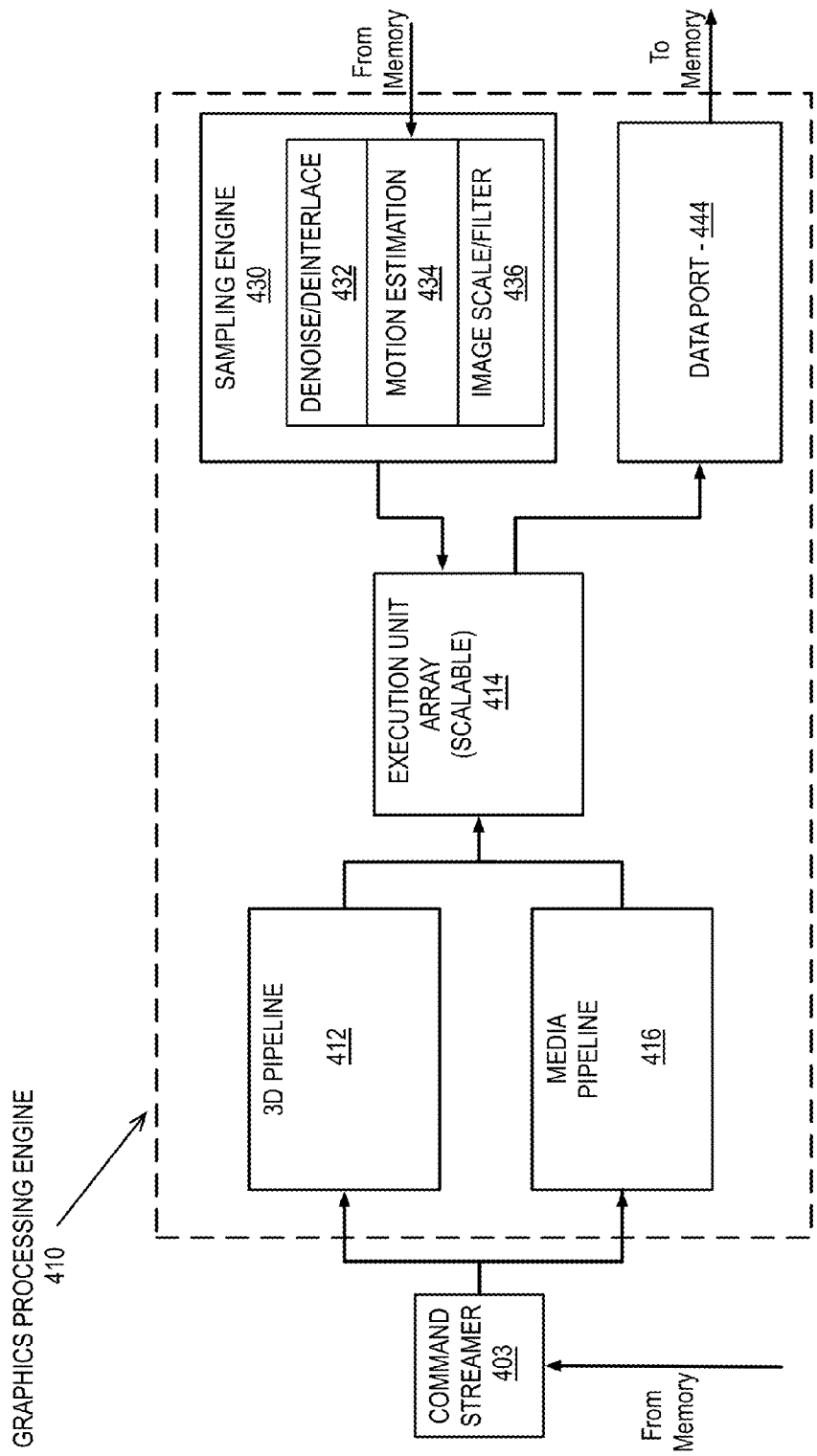
FIG. 4 is a block diagram of an embodiment of a graphics processing engine for a graphics processor.

FIG. 4 is a block diagram of a graphics processing engine 410 of a graphics processor in accordance with some embodiments. In one embodiment, the GPE 410 is a version of the GPE 310 shown in FIG. 3. Elements of FIG. 4 having the same reference numbers (or names) as the elements of any other figure herein can operate or function in any manner similar to that described elsewhere herein, but are not limited to such.

In some embodiments, GPE 410 couples with a command streamer 403, which provides a command stream to the GPE 3D and media pipelines 412, 416. In some embodiments, command streamer 403 is coupled to memory, which can be system memory, or one or more of internal cache memory and shared cache memory. In some embodiments, command streamer 403 receives commands from the memory and sends the commands to 3D pipeline 412 and/or media pipeline 416. The commands are directives fetched from a ring buffer, which stores commands for the 3D and media pipelines 412, 416. In one embodiment, the ring buffer can additionally include batch command buffers storing batches of multiple commands. The 3D and media pipelines 412, 416 process the commands by performing operations via logic within the respective pipelines or by dispatching one or more execution threads to an execution unit array 414. In some embodiments, execution unit array 414 is scalable, such that the array includes a variable number of execution units based on the target power and performance level of GPE 410.

In some embodiments, a sampling engine 430 couples with memory (e.g., cache memory or system memory) and execution unit array 414. In some embodiments, sampling engine 430 provides a memory access mechanism for execution unit array 414 that allows execution array 414 to read graphics and media data from memory. In some embodiments, sampling engine 430 includes logic to perform specialized image sampling operations for media.

In some embodiments, the specialized media sampling logic in sampling engine 430 includes a de-noise/de-interlace module 432, a motion estimation module 434, and an image scaling and filtering module 436. In some embodiments, de-noise/de-interlace module 432 includes logic to perform one or more of a de-noise or a de-interlace algorithm on decoded video data. The de-interlace logic combines alternating fields of interlaced video content into a single fame of video. The de-noise logic reduces or removes data noise from video and image data. In some embodiments, the de-noise logic and de-interlace logic are motion adaptive and use spatial or temporal filtering based on the amount of motion detected in the video data. In some embodiments, the de-noise/de-interlace module 432 includes dedicated motion detection logic (e.g., within the motion estimation engine 434).

In some embodiments, motion estimation engine 434 provides hardware acceleration for video operations by performing video acceleration functions such as motion vector estimation and prediction on video data. The motion estimation engine determines motion vectors that describe the transformation of image data between successive video frames. In some embodiments, a graphics processor media codec uses video motion estimation engine 434 to perform operations on video at the macro-block level that may otherwise be too computationally intensive to perform with a general-purpose processor. In some embodiments, motion estimation engine 434 is generally available to graphics processor components to assist with video decode and processing functions that are sensitive or adaptive to the direction or magnitude of the motion within video data.

In some embodiments, image scaling and filtering module 436 performs image-processing operations to enhance the visual quality of generated images and video. In some embodiments, scaling and filtering module 436 processes image and video data during the sampling operation before providing the data to execution unit array 414.

In some embodiments, the GPE 410 includes a data port 444, which provides an additional mechanism for graphics subsystems to access memory. In some embodiments, data port 444 facilitates memory access for operations including render target writes, constant buffer reads, scratch memory space reads/writes, and media surface accesses. In some embodiments, data port 444 includes cache memory space to cache accesses to memory. The cache memory can be a single data cache or separated into multiple caches for the multiple subsystems that access memory via the data port (e.g., a render buffer cache, a constant buffer cache, etc.). In some embodiments, threads executing on an execution unit in execution unit array 414 communicate with the data port by exchanging messages via a data distribution interconnect that couples each of the sub-systems of GPE 410.

Execution Units

Figure 5:
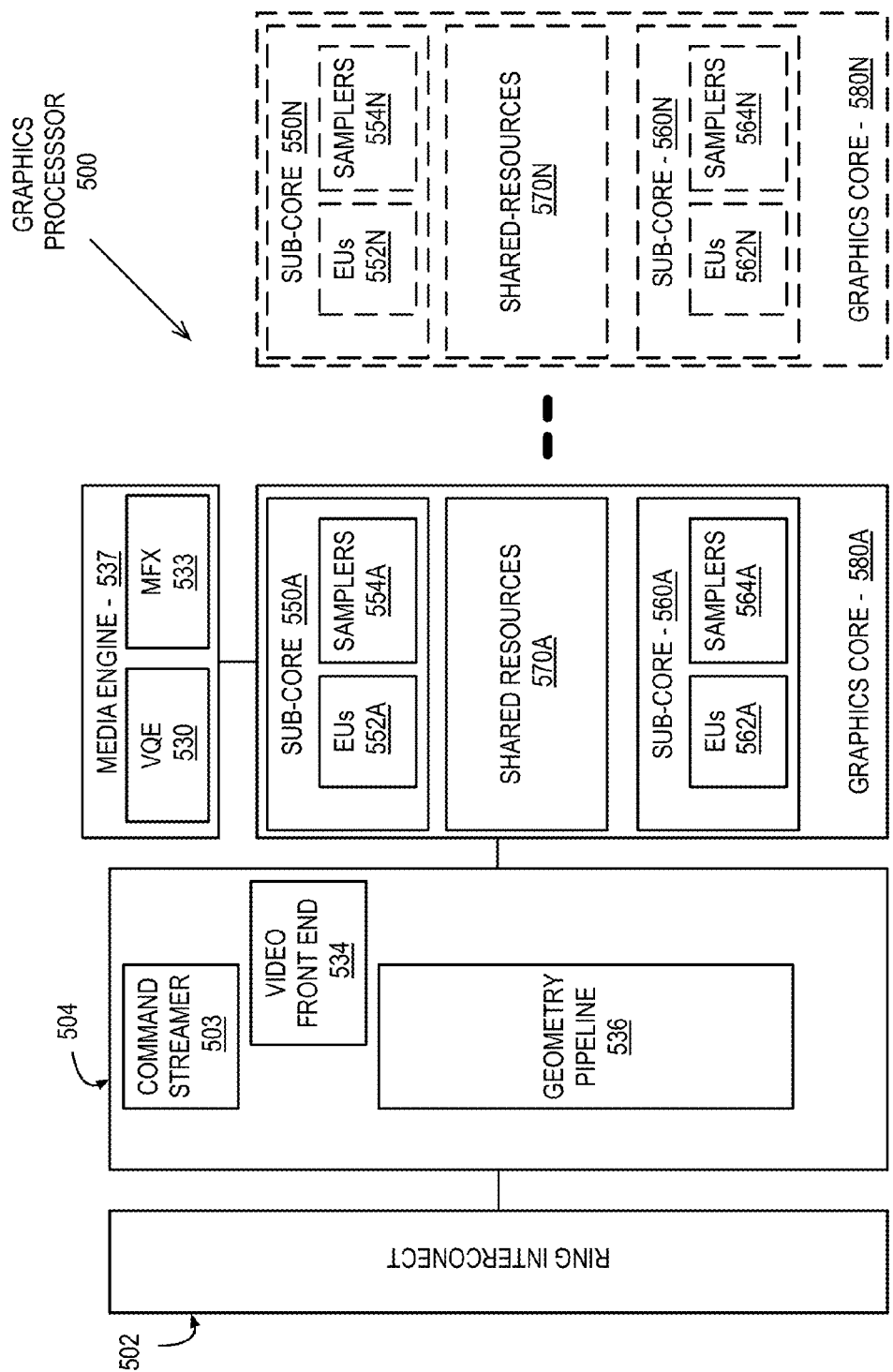
FIG. 5 is a block diagram of another embodiment of a graphics processor.

FIG. 5 is a block diagram of another embodiment of a graphics processor 500. Elements of FIG. 5 having the same reference numbers (or names) as the elements of any other figure herein can operate or function in any manner similar to that described elsewhere herein, but are not limited to such.

In some embodiments, graphics processor 500 includes a ring interconnect 502, a pipeline front-end 504, a media engine 537, and graphics cores 580A-580N. In some embodiments, ring interconnect 502 couples the graphics processor to other processing units, including other graphics processors or one or more general-purpose processor cores.

In some embodiments, the graphics processor is one of many processors integrated within a multi-core processing system.

In some embodiments, graphics processor 500 receives batches of commands via ring interconnect 502. The incoming commands are interpreted by a command streamer 503 in the pipeline front-end 504. In some embodiments, graphics processor 500 includes scalable execution logic to perform 3D geometry processing and media processing via the graphics core(s) 580A-580N. For 3D geometry processing commands, command streamer 503 supplies commands to geometry pipeline 536. For at least some media processing commands, command streamer 503 supplies the commands to a video front end 534, which couples with a media engine 537. In some embodiments, media engine 537 includes a Video Quality Engine (VQE) 530 for video and image post-processing and a multi-format encode/decode (MFX) 533 engine to provide hardware-accelerated media data encode and decode. In some embodiments, geometry pipeline 536 and media engine 537 each generate execution threads for the thread execution resources provided by at least one graphics core 580A.

In some embodiments, graphics processor 500 includes scalable thread execution resources featuring modular cores 580A-580N (sometimes referred to as core slices), each having multiple sub-cores 550A-550N, 560A-560N (sometimes referred to as core sub-slices). In some embodiments, graphics processor 500 can have any number of graphics cores 580A through 580N. In some embodiments, graphics processor 500 includes a graphics core 580A having at least a first sub-core 550A and a second core sub-core 560A. In other embodiments, the graphics processor is a low power processor with a single sub-core (e.g., 550A). In some embodiments, graphics processor 500 includes multiple graphics cores 580A-580N, each including a set of first sub-cores 550A-550N and a set of second sub-cores 560A-560N. Each sub-core in the set of first sub-cores 550A-550N includes at least a first set of execution units 552A-552N and media/texture samplers 554A-554N. Each sub-core in the set of second sub-cores 560A-560N includes at least a second set of execution units 562A-562N and samplers 564A-564N. In some embodiments, each sub-core 550A-550N, 560A-560N shares a set of shared resources 570A-570N. In some embodiments, the shared resources include shared cache memory and pixel operation logic. Other shared resources may also be included in the various embodiments of the graphics processor.

Figure 6:
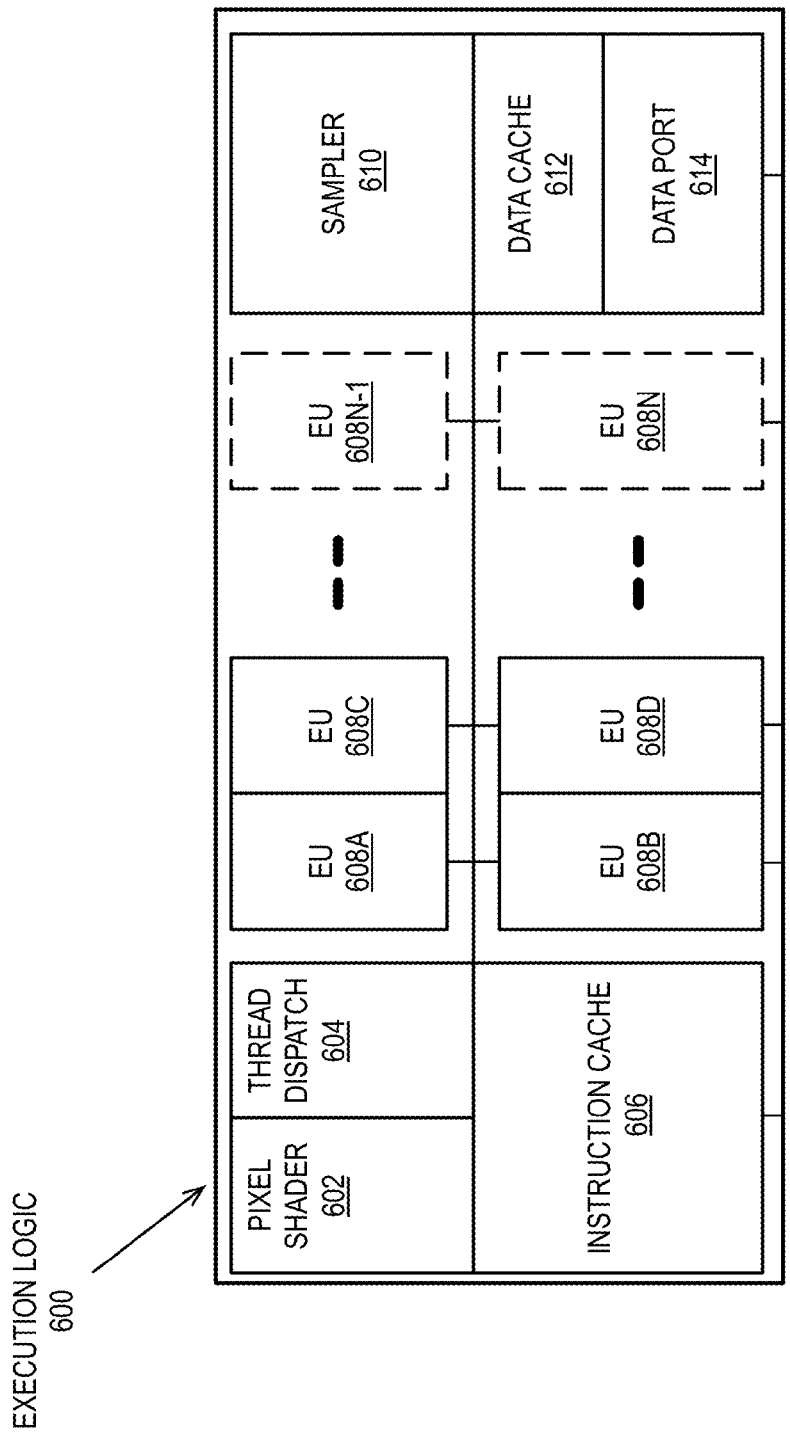
FIG. 6 is a block diagram of thread execution logic including an array of processing elements.

FIG. 6 illustrates thread execution logic 600 including an array of processing elements employed in some embodiments of a GPE. Elements of FIG. 6 having the same reference numbers (or names) as the elements of any other figure herein can operate or function in any manner similar to that described elsewhere herein, but are not limited to such.

In some embodiments, thread execution logic 600 includes a pixel shader 602, a thread dispatcher 604, instruction cache 606, a scalable execution unit array including a plurality of execution units 608A-608N, a sampler 610, a data cache 612, and a data port 614. In one embodiment the included components are interconnected via an interconnect fabric that links to each of the components. In some embodiments, thread execution logic 600 includes one or more connections to memory, such as system memory or cache memory, through one or more of instruction cache 606, data port 614, sampler 610, and execution unit array 608A-608N. In some embodiments, each execution unit (e.g. 608A) is an individual vector processor capable of executing multiple simultaneous threads and processing multiple data elements in parallel for each thread. In some embodiments, execution unit array 608A-608N includes any number individual execution units.

In some embodiments, execution unit array 608A-608N is primarily used to execute "shader" programs. In some embodiments, the execution units in array 608A-608N execute an instruction set that includes native support for many standard 3D graphics shader instructions, such that shader programs from graphics libraries (e.g., Direct 3D and OpenGL) are executed with a minimal translation. The execution units support vertex and geometry processing (e.g., vertex programs, geometry programs, vertex shaders), pixel processing (e.g., pixel shaders, fragment shaders) and general-purpose processing (e.g., compute and media shaders).

Each execution unit in execution unit array 608A-608N operates on arrays of data elements. The number of data elements is the "execution size," or the number of channels for the instruction. An execution channel is a logical unit of execution for data element access, masking, and flow control within instructions. The number of channels may be independent of the number of physical Arithmetic Logic Units (ALUs) or Floating Point Units (FPUs) for a particular graphics processor. In some embodiments, execution units 608A-608N support integer and floating-point data types.

The execution unit instruction set includes single instruction multiple data (SIMD) instructions. The various data elements can be stored as a packed data type in a register and the execution unit will process the various elements based on the data size of the elements. For example, when operating on a 256-bit wide vector, the 256 bits of the vector are stored in a register and the execution unit operates on the vector as four separate 64-bit packed data elements (Quad-Word (QW) size data elements), eight separate 32-bit packed data elements (Double Word (DW) size data elements), sixteen separate 16-bit packed data elements (Word (W) size data elements), or thirty-two separate 8-bit data elements (byte (B) size data elements). However, different vector widths and register sizes are possible.

One or more internal instruction caches (e.g., 606) are included in the thread execution logic 600 to cache thread instructions for the execution units. In some embodiments, one or more data caches (e.g., 612) are included to cache thread data during thread execution. In some embodiments, sampler 610 is included to provide texture sampling for 3D operations and media sampling for media operations. In some embodiments, sampler 610 includes specialized texture or media sampling functionality to process texture or media data during the sampling process before providing the sampled data to an execution unit.

During execution, the graphics and media pipelines send thread initiation requests to thread execution logic 600 via thread spawning and dispatch logic. In some embodiments, thread execution logic 600 includes a local thread dispatcher 604 that arbitrates thread initiation requests from the graphics and media pipelines and instantiates the requested threads on one or more execution units 608A-608N. For example, the geometry pipeline (e.g., 536 of FIG. 5) dispatches vertex processing, tessellation, or geometry processing threads to thread execution logic 600 (FIG. 6). In some embodiments, thread dispatcher 604 can also process runtime thread spawning requests from the executing shader programs.

Once a group of geometric objects has been processed and rasterized into pixel data, pixel shader 602 is invoked to further compute output information and cause results to be written to output surfaces (e.g., color buffers, depth buffers, stencil buffers, etc.). In some embodiments, pixel shader 602 calculates the values of the various vertex attributes that are to be interpolated across the rasterized object. In some embodiments, pixel shader 602 then executes an application programming interface (API)-supplied pixel shader program. To execute the pixel shader program, pixel shader 602 dispatches threads to an execution unit (e.g., 608A) via thread dispatcher 604. In some embodiments, pixel shader 602 uses texture sampling logic in sampler 610 to access texture data in texture maps stored in memory. Arithmetic operations on the texture data and the input geometry data compute pixel color data for each geometric fragment, or discards one or more pixels from further processing.

In some embodiments, the data port 614 provides a memory access mechanism for the thread execution logic 600 output processed data to memory for processing on a graphics processor output pipeline. In some embodiments, the data port 614 includes or couples to one or more cache memories (e.g., data cache 612) to cache data for memory access via the data port.

Figure 7:
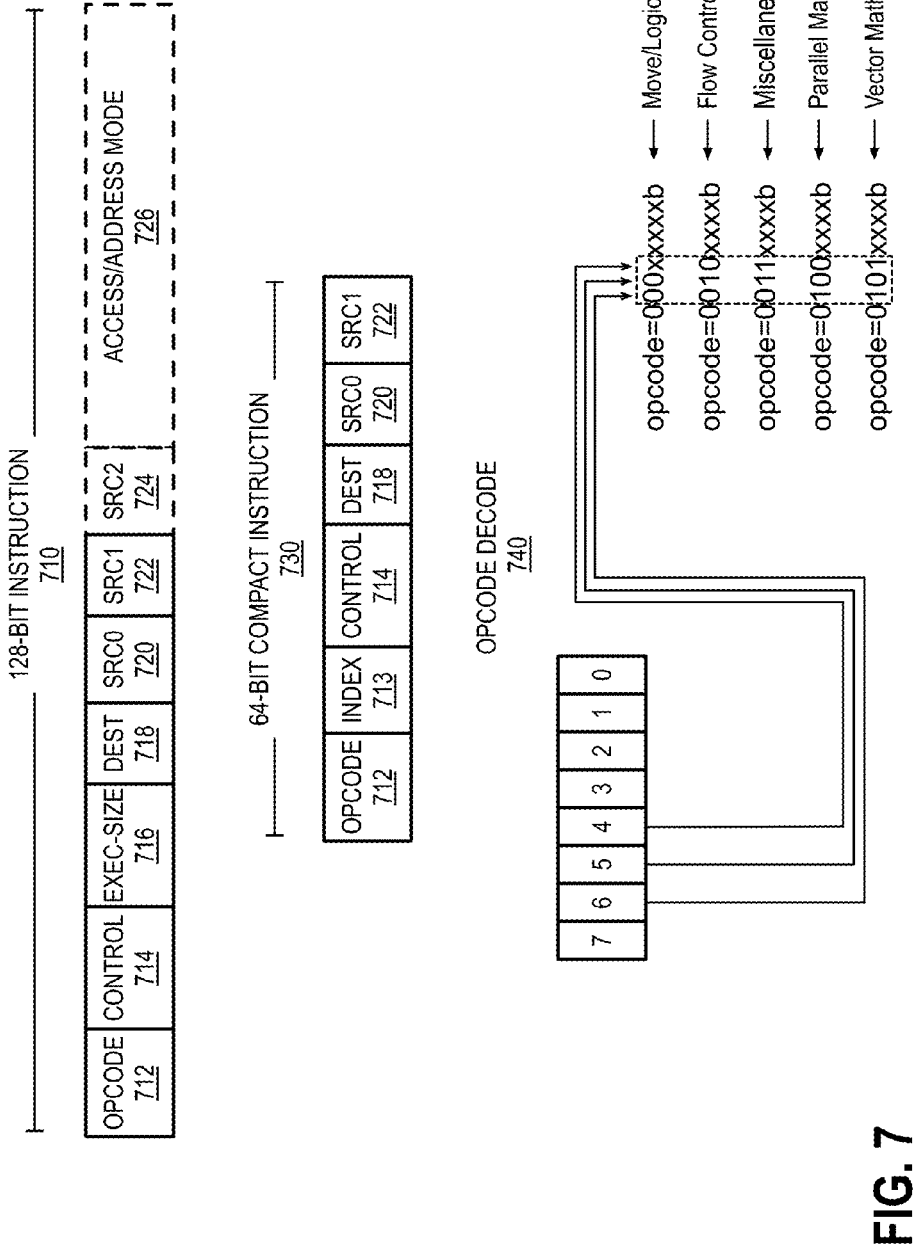
FIG. 7 illustrates a graphics processor execution unit instruction format according to an embodiment.

FIG. 7 is a block diagram illustrating a graphics processor instruction formats 700 according to some embodiments. In one or more embodiment, the graphics processor execution units support an instruction set having instructions in multiple formats. The solid lined boxes illustrate the components that are generally included in an execution unit instruction, while the dashed lines include components that are optional or that are only included in a sub-set of the instructions. In some embodiments, instruction format 700 described and illustrated are macro-instructions, in that they are instructions supplied to the execution unit, as opposed to micro-operations resulting from instruction decode once the instruction is processed.

In some embodiments, the graphics processor execution units natively support instructions in a 128-bit format 710. A 64-bit compacted instruction format 730 is available for some instructions based on the selected instruction, instruction options, and number of operands. The native 128-bit format 710 provides access to all instruction options, while some options and operations are restricted in the 64-bit format 730. The native instructions available in the 64-bit format 730 vary by embodiment. In some embodiments, the instruction is compacted in part using a set of index values in an index field 713. The execution unit hardware references a set of compaction tables based on the index values and uses the compaction table outputs to reconstruct a native instruction in the 128-bit format 710.

For each format, instruction opcode 712 defines the operation that the execution unit is to perform. The execution units execute each instruction in parallel across the multiple data elements of each operand. For example, in response to an add instruction the execution unit performs a simultaneous add operation across each color channel representing a texture element or picture element. By default, the execution unit performs each instruction across all data channels of the operands. In some embodiments, instruction control field 714 enables control over certain execution options, such as channels selection (e.g., predication) and data channel order (e.g., swizzle). For 128-bit instructions 710 an exec-size field 716 limits the number of data channels that will be executed in parallel. In some embodiments, exec-size field 716 is not available for use in the 64-bit compact instruction format 730.

Some execution unit instructions have up to three operands including two source operands, src0 720, src1 722, and one destination 718. In some embodiments, the execution units support dual destination instructions, where one of the destinations is implied. Data manipulation instructions can have a third source operand (e.g., SRC2 724), where the instruction opcode 712 determines the number of source operands. An instruction's last source operand can be an immediate (e.g., hard-coded) value passed with the instruction.

In some embodiments, the 128-bit instruction format 710 includes an access/address mode information 726 specifying, for example, whether direct register addressing mode or indirect register addressing mode is used. When direct register addressing mode is used, the register address of one or more operands is directly provided by bits in the instruction 710.

In some embodiments, the 128-bit instruction format 710 includes an access/address mode field 726, which specifies an address mode and/or an access mode for the instruction. In one embodiment the access mode to define a data access alignment for the instruction. Some embodiments support access modes including a 16-byte aligned access mode and a 1-byte aligned access mode, where the byte alignment of the access mode determines the access alignment of the instruction operands. For example, when in a first mode, the instruction 710 may use byte-aligned addressing for source and destination operands and when in a second mode, the instruction 710 may use 16-byte-aligned addressing for all source and destination operands.

In one embodiment, the address mode portion of the access/address mode field 726 determines whether the instruction is to use direct or indirect addressing. When direct register addressing mode is used bits in the instruction 710 directly provide the register address of one or more operands. When indirect register addressing mode is used, the register address of one or more operands may be computed based on an address register value and an address immediate field in the instruction.

In some embodiments instructions are grouped based on opcode 712 bit-fields to simplify Opcode decode 740. For an 8-bit opcode, bits 4, 5, and 6 allow the execution unit to determine the type of opcode. The precise opcode grouping shown is merely an example. In some embodiments, a move and logic opcode group 742 includes data movement and logic instructions (e.g., move (mov), compare (cmp)). In some embodiments, move and logic group 742 shares the five most significant bits (MSB), where move (mov) instructions are in the form of 0000xxxxb and logic instructions are in the form of 0001xxxxb. A flow control instruction group 744 (e.g., call, jump (jmp)) includes instructions in the form of 0010xxxxb (e.g., 0x20). A miscellaneous instruction group 746 includes a mix of instructions, including synchronization instructions (e.g., wait, send) in the form of 0011xxxxb (e.g., 0x30). A parallel math instruction group 748 includes component-wise arithmetic instructions (e.g., add, multiply (mul)) in the form of 0100xxxxb (e.g., 0x40). The parallel math group 748 performs the arithmetic operations in parallel across data channels. The vector math group 750 includes arithmetic instructions (e.g., dp4) in the form of 0101xxxxb (e.g., 0x50). The vector math group performs arithmetic such as dot product calculations on vector operands.

Graphics Pipeline

Figure 8:
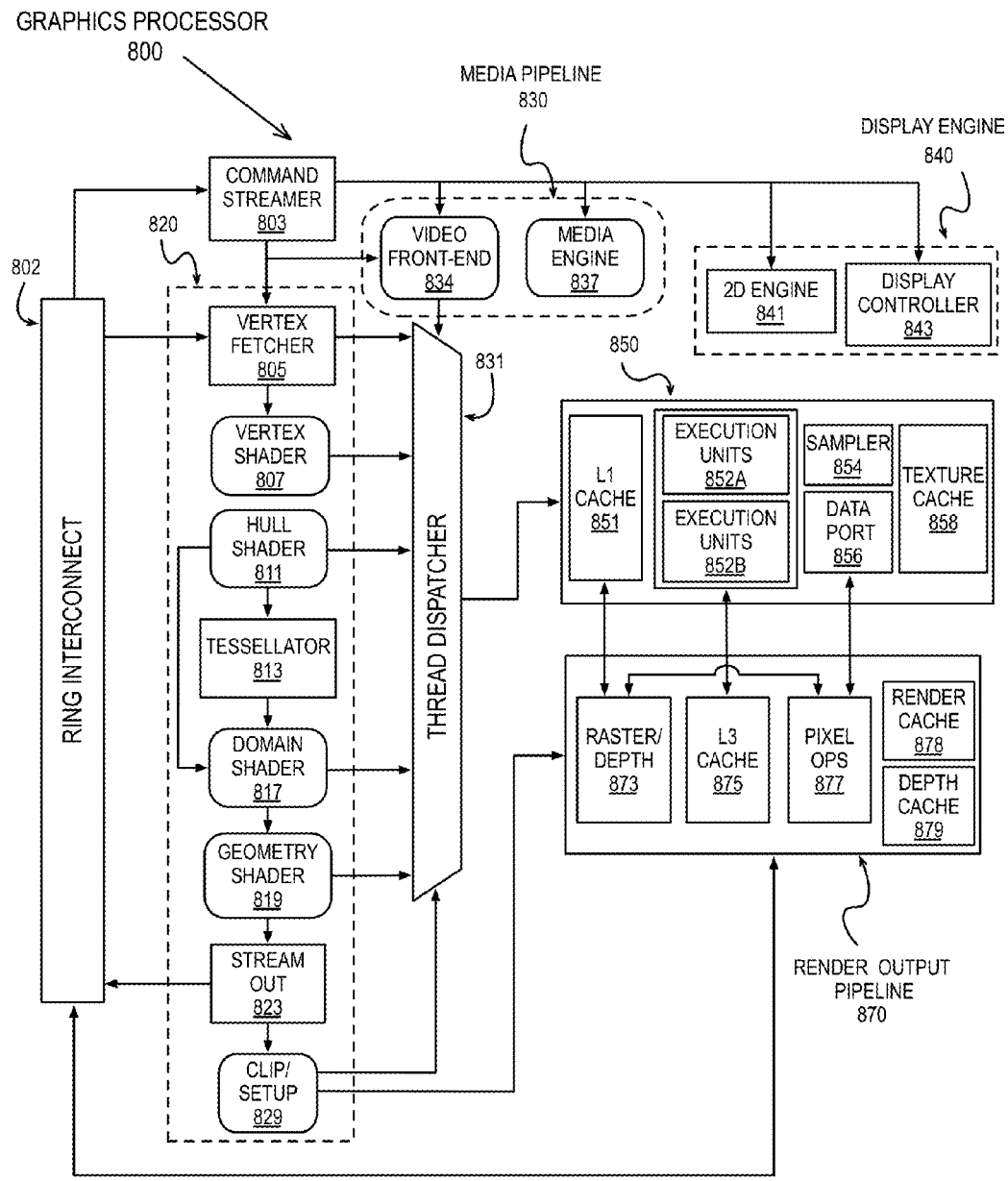
FIG. 8 is a block diagram of another embodiment of a graphics processor which includes a graphics pipeline, a media pipeline, a display engine, thread execution logic, and a render output pipeline.

FIG. 8 is a block diagram of another embodiment of a graphics processor 800. Elements of FIG. 8 having the same reference numbers (or names) as the elements of any other figure herein can operate or function in any manner similar to that described elsewhere herein, but are not limited to such.

In some embodiments, graphics processor 800 includes a graphics pipeline 820, a media pipeline 830, a display engine 840, thread execution logic 850, and a render output pipeline 870. In some embodiments, graphics processor 800 is a graphics processor within a multi-core processing system that includes one or more general-purpose processing cores. The graphics processor is controlled by register writes to one or more control registers (not shown) or via commands issued to graphics processor 800 via a ring interconnect 802. In some embodiments, ring interconnect 802 couples graphics processor 800 to other processing components, such as other graphics processors or general-purpose processors. Commands from ring interconnect 802 are interpreted by a command streamer 803, which supplies instructions to individual components of graphics pipeline 820 or media pipeline 830.

In some embodiments, command streamer 803 directs the operation of a vertex fetcher 805 that reads vertex data from memory and executes vertex-processing commands provided by command streamer 803. In some embodiments, vertex fetcher 805 provides vertex data to a vertex shader 807, which performs coordinate space transformation and lighting operations to each vertex. In some embodiments, vertex fetcher 805 and vertex shader 807 execute vertex-processing instructions by dispatching execution threads to execution units 852A, 852B via a thread dispatcher 831.

In some embodiments, execution units 852A, 852B are an array of vector processors having an instruction set for performing graphics and media operations. In some embodiments, execution units 852A, 852B have an attached L1 cache 851 that is specific for each array or shared between the arrays. The cache can be configured as a data cache, an instruction cache, or a single cache that is partitioned to contain data and instructions in different partitions.

In some embodiments, graphics pipeline 820 includes tessellation components to perform hardware-accelerated tessellation of 3D objects. In some embodiments, a programmable hull shader 811 configures the tessellation operations. A programmable domain shader 817 provides back-end evaluation of tessellation output. A tessellator 813 operates at the direction of hull shader 811 and contains special purpose logic to generate a set of detailed geometric objects based on a coarse geometric model that is provided as input to graphics pipeline 820. In some embodiments, if tessellation is not used, tessellation components 811, 813, 817 can be bypassed.

In some embodiments, complete geometric objects can be processed by a geometry shader 819 via one or more threads dispatched to execution units 852A, 852B, or can proceed directly to the clipper 829. In some embodiments, the geometry shader operates on entire geometric objects, rather than vertices or patches of vertices as in previous stages of the graphics pipeline. If the tessellation is disabled the geometry shader 819 receives input from the vertex shader 807. In some embodiments, geometry shader 819 is programmable by a geometry shader program to perform geometry tessellation if the tessellation units are disabled.

Before rasterization, a clipper 829 processes vertex data. The clipper 829 may be a fixed function clipper or a programmable clipper having clipping and geometry shader functions. In some embodiments, a rasterizer and depth test component 873 in the render output pipeline 870 dispatches pixel shaders to convert the geometric objects into their per pixel representations. In some embodiments, pixel shader logic is included in thread execution logic 850. In some embodiments, an application can bypass the rasterizer 873 and access un-rasterized vertex data via a stream out unit 823.

The graphics processor 800 has an interconnect bus, interconnect fabric, or some other interconnect mechanism that allows data and message passing amongst the major components of the processor. In some embodiments, execution units 852A, 852B and associated cache(s) 851, texture and media sampler 854, and texture/sampler cache 858 interconnect via a data port 856 to perform memory access and communicate with render output pipeline components of the processor. In some embodiments, sampler 854, caches 851, 858 and execution units 852A, 852B each have separate memory access paths.

In some embodiments, render output pipeline 870 contains a depth test component and rasterizer 873 that converts vertex-based objects into an associated pixel-based representation. In some embodiments, the render output pipeline 870 includes a windower/masker unit to perform fixed function triangle and line rasterization. An associated render cache 878 and depth cache 879 are also available in some embodiments. A pixel operations component 877 performs pixel-based operations on the data, though in some instances, pixel operations associated with 2D operations (e.g. bit block image transfers with blending) are performed by the 2D engine 841, or substituted at display time by the display controller 843 using overlay display planes. In some embodiments, a shared L3 cache 875 is available to all graphics components, allowing the sharing of data without the use of main system memory.

In some embodiments, graphics processor media pipeline 830 includes a media engine 837 and a video front end 834. In some embodiments, video front end 834 receives pipeline commands from the command streamer 803. In some embodiments, media pipeline 830 includes a separate command streamer. In some embodiments, video front-end 834 processes media commands before sending the command to the media engine 837. In some embodiments, media engine 837 includes thread spawning functionality to spawn threads for dispatch to thread execution logic 850 via thread dispatcher 831.

In some embodiments, graphics processor 800 includes a display engine 840. In some embodiments, display engine 840 is external to processor 800 and couples with the graphics processor via the ring interconnect 802, or some other interconnect bus or fabric. In some embodiments, display engine 840 includes a 2D engine 841 and a display controller 843. In some embodiments, display engine 840 contains special purpose logic capable of operating independently of the 3D pipeline. In some embodiments, display controller 843 couples with a display device (not shown), which may be a system integrated display device, as in a laptop computer, or an external display device attached via a display device connector.

In some embodiments, graphics pipeline 820 and media pipeline 830 are configurable to perform operations based on multiple graphics and media programming interfaces and are not specific to any one application programming interface (API). In some embodiments, driver software for the graphics processor translates API calls that are specific to a particular graphics or media library into commands that can be processed by the graphics processor. In some embodiments, support is provided for the Open Graphics Library (OpenGL) and Open Computing Language (OpenCL) from the Khronos Group, the Direct3D library from the Microsoft Corporation, or support may be provided to both OpenGL and D3D. Support may also be provided for the Open Source Computer Vision Library (OpenCV). A future API with a compatible 3D pipeline would also be supported if a mapping can be made from the pipeline of the future API to the pipeline of the graphics processor.

Graphics Pipeline Programming

FIG. 9A is a block diagram illustrating a graphics processor command format 900 according to some embodiments. FIG. 9B is a block diagram illustrating a graphics processor command sequence 910 according to an embodiment. The solid lined boxes in FIG. 9A illustrate the components that are generally included in a graphics command while the dashed lines include components that are optional or that are only included in a sub-set of the graphics commands. The exemplary graphics processor command format 900 of FIG. 9A includes data fields to identify a target client 902 of the command, a command operation code (opcode) 904, and the relevant data 906 for the command. A sub-opcode 905 and a command size 908 are also included in some commands.

In some embodiments, client 902 specifies the client unit of the graphics device that processes the command data. In some embodiments, a graphics processor command parser examines the client field of each command to condition the further processing of the command and route the command data to the appropriate client unit. In some embodiments, the graphics processor client units include a memory interface unit, a render unit, a 2D unit, a 3D unit, and a media unit. Each client unit has a corresponding processing pipeline that processes the commands. Once the command is received by the client unit, the client unit reads the opcode 904 and, if present, sub-opcode 905 to determine the operation to perform. The client unit performs the command using information in data field 906. For some commands an explicit command size 908 is expected to specify the size of the command. In some embodiments, the command parser automatically determines the size of at least some of the commands based on the command opcode. In some embodiments commands are aligned via multiples of a double word.

The flow diagram in FIG. 9B shows an exemplary graphics processor command sequence 910. In some embodiments, software or firmware of a data processing system that features an embodiment of a graphics processor uses a version of the command sequence shown to set up, execute, and terminate a set of graphics operations. A sample command sequence is shown and described for purposes of example only as embodiments are not limited to these specific commands or to this command sequence. Moreover, the commands may be issued as batch of commands in a command sequence, such that the graphics processor will process the sequence of commands in at least partially concurrence.

In some embodiments, the graphics processor command sequence 910 may begin with a pipeline flush command 912 to cause any active graphics pipeline to complete the currently pending commands for the pipeline. In some embodiments, the 3D pipeline 922 and the media pipeline 924 do not operate concurrently. The pipeline flush is performed to cause the active graphics pipeline to complete any pending commands. In response to a pipeline flush, the command parser for the graphics processor will pause command processing until the active drawing engines complete pending operations and the relevant read caches are invalidated. Optionally, any data in the render cache that is marked 'dirty' can be flushed to memory. In some embodiments, pipeline flush command 912 can be used for pipeline synchronization or before placing the graphics processor into a low power state.

In some embodiments, a pipeline select command 913 is used when a command sequence requires the graphics processor to explicitly switch between pipelines. In some embodiments, a pipeline select command 913 is required only once within an execution context before issuing pipeline commands unless the context is to issue commands for both pipelines. In some embodiments, a pipeline flush command is 912 is required immediately before a pipeline switch via the pipeline select command 913.

In some embodiments, a pipeline control command 914 configures a graphics pipeline for operation and is used to program the 3D pipeline 922 and the media pipeline 924. In some embodiments, pipeline control command 914 configures the pipeline state for the active pipeline. In one embodiment, the pipeline control command 914 is used for pipeline synchronization and to clear data from one or more cache memories within the active pipeline before processing a batch of commands.

In some embodiments, return buffer state commands 916 are used to configure a set of return buffers for the respective pipelines to write data. Some pipeline operations require the allocation, selection, or configuration of one or more return buffers into which the operations write intermediate data during processing. In some embodiments, the graphics processor also uses one or more return buffers to store output data and to perform cross thread communication. In some embodiments, the return buffer state 916 includes selecting the size and number of return buffers to use for a set of pipeline operations.

The remaining commands in the command sequence differ based on the active pipeline for operations. Based on a pipeline determination 920, the command sequence is tailored to the 3D pipeline 922 beginning with the 3D pipeline state 930, or the media pipeline 924 beginning at the media pipeline state 940.

The commands for the 3D pipeline state 930 include 3D state setting commands for vertex buffer state, vertex element state, constant color state, depth buffer state, and other state variables that are to be configured before 3D primitive commands are processed. The values of these commands are determined at least in part based the particular 3D API in use. In some embodiments, 3D pipeline state 930 commands are also able to selectively disable or bypass certain pipeline elements if those elements will not be used.

In some embodiments, 3D primitive 932 command is used to submit 3D primitives to be processed by the 3D pipeline. Commands and associated parameters that are passed to the graphics processor via the 3D primitive 932 command are forwarded to the vertex fetch function in the graphics pipeline. The vertex fetch function uses the 3D primitive 932 command data to generate vertex data structures. The vertex data structures are stored in one or more return buffers. In some embodiments, 3D primitive 932 command is used to perform vertex operations on 3D primitives via vertex shaders. To process vertex shaders, 3D pipeline 922 dispatches shader execution threads to graphics processor execution units.

In some embodiments, 3D pipeline 922 is triggered via an execute 934 command or event. In some embodiments, a register write triggers command execution. In some embodiments execution is triggered via a 'go' or 'kick' command in the command sequence. In one embodiment command execution is triggered using a pipeline synchronization command to flush the command sequence through the graphics pipeline. The 3D pipeline will perform geometry processing for the 3D primitives. Once operations are complete, the resulting geometric objects are rasterized and the pixel engine colors the resulting pixels. Additional commands to control pixel shading and pixel back end operations may also be included for those operations.

In some embodiments, the graphics processor command sequence 910 follows the media pipeline 924 path when performing media operations. In general, the specific use and manner of programming for the media pipeline 924 depends on the media or compute operations to be performed. Specific media decode operations may be offloaded to the media pipeline during media decode. In some embodiments, the media pipeline can also be bypassed and media decode can be performed in whole or in part using resources provided by one or more general-purpose processing cores. In one embodiment, the media pipeline also includes elements for general-purpose graphics processor unit (GPGPU) operations, where the graphics processor is used to perform SIMD vector operations using computational shader programs that are not explicitly related to the rendering of graphics primitives.

In some embodiments, media pipeline 924 is configured in a similar manner as the 3D pipeline 922. A set of media pipeline state commands 940 are dispatched or placed into in a command queue before the media object commands 942. In some embodiments, media pipeline state commands 940 include data to configure the media pipeline elements that will be used to process the media objects. This includes data to configure the video decode and video encode logic within the media pipeline, such as encode or decode format. In some embodiments, media pipeline state commands 940 also support the use one or more pointers to "indirect" state elements that contain a batch of state settings.

In some embodiments, media object commands 942 supply pointers to media objects for processing by the media pipeline. The media objects include memory buffers containing video data to be processed. In some embodiments, all media pipeline states must be valid before issuing a media object command 942. Once the pipeline state is configured and media object commands 942 are queued, the media pipeline 924 is triggered via an execute command 944 or an equivalent execute event (e.g., register write). Output from media pipeline 924 may then be post processed by operations provided by the 3D pipeline 922 or the media pipeline 924. In some embodiments, GPGPU operations are configured and executed in a similar manner as media operations.

Graphics Software Architecture

Figure 10:
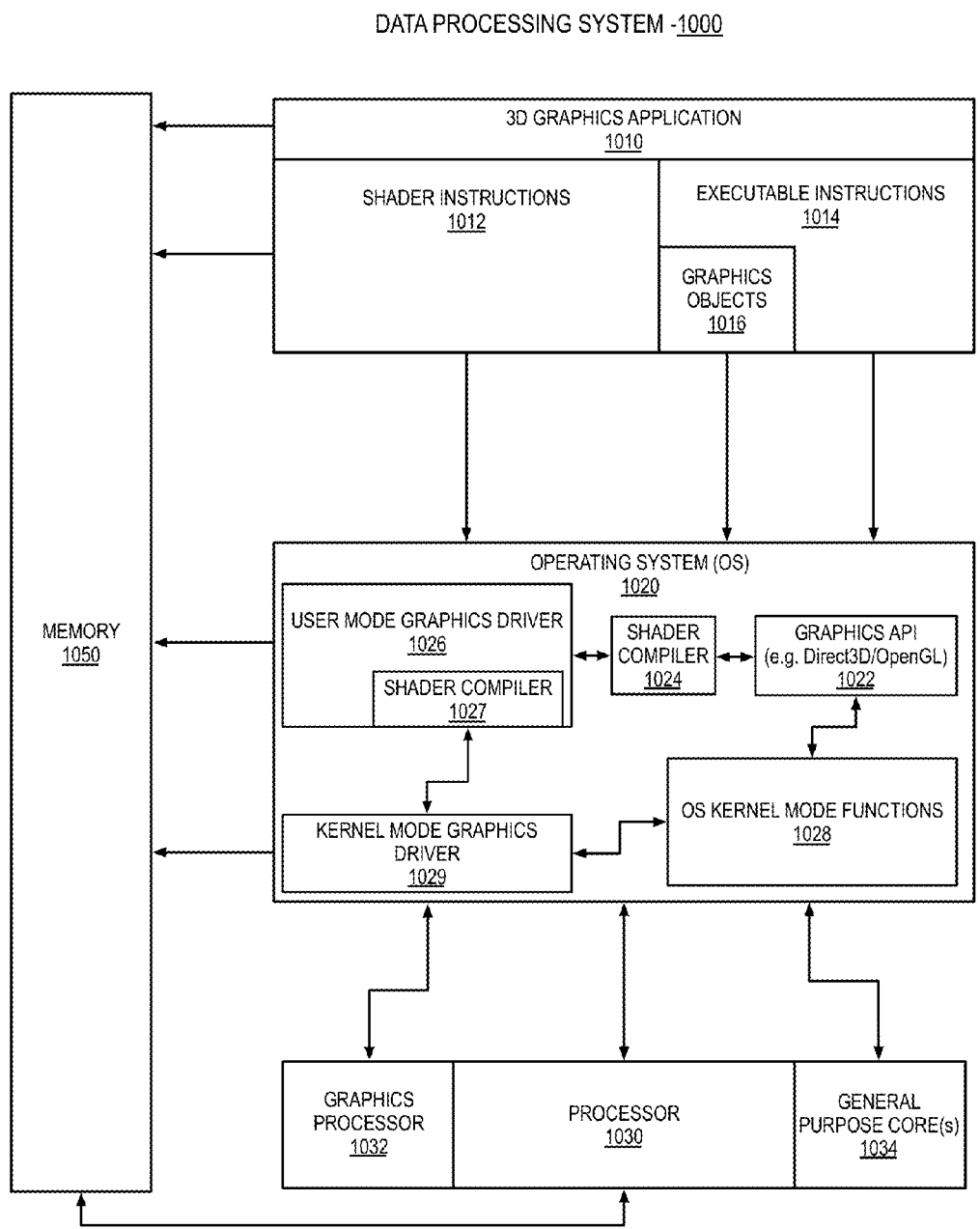
FIG. 10 illustrates exemplary graphics software architecture for a data processing system according to an embodiment.

FIG. 10 illustrates exemplary graphics software architecture for a data processing system 1000 according to some embodiments. In some embodiments, software architecture includes a 3D graphics application 1010, an operating system 1020, and at least one processor 1030. In some embodiments, processor 1030 includes a graphics processor 1032 and one or more general-purpose processor core(s) 1034. The graphics application 1010 and operating system 1020 each execute in the system memory 1050 of the data processing system.

In some embodiments, 3D graphics application 1010 contains one or more shader programs including shader instructions 1012. The shader language instructions may be in a high-level shader language, such as the High Level Shader Language (HLSL) or the OpenGL Shader Language (GLSL). The application also includes executable instructions 1014 in a machine language suitable for execution by the general-purpose processor core(s) 1034. The application also includes graphics objects 1016 defined by vertex data.

In some embodiments, operating system 1020 is a Microsoft® Windows® operating system from the Microsoft Corporation, a proprietary UNIX-like operating system, or an open source UNIX-like operating system using a variant of the Linux kernel. The operating system 1020 can support a graphics API 1022 such as the Direct3D API or the OpenGL API. When the Direct3D API is in use, the operating system 1020 uses a front-end shader compiler 1024 to compile any shader instructions 1012 in HLSL into a lower-level shader language. The compilation may be a just-in-time (JIT) compilation or the application can perform shader pre-compilation. In some embodiments, high-level shaders are compiled into low-level shaders during the compilation of the 3D graphics application 1010.

In some embodiments, user mode graphics driver 1026 contains a back-end shader compiler 1027 to convert the shader instructions 1012 into a hardware specific representation. When the OpenGL API is in use, shader instructions 1012 in the GLSL high-level language are passed to a user mode graphics driver 1026 for compilation. In some embodiments, user mode graphics driver 1026 uses operating system kernel mode functions 1028 to communicate with a kernel mode graphics driver 1029. In some embodiments, kernel mode graphics driver 1029 communicates with graphics processor 1032 to dispatch commands and instructions.

IP Core Implementations

One or more aspects of at least one embodiment may be implemented by representative code stored on a machine-readable medium which represents and/or defines logic within an integrated circuit such as a processor. For example, the machine-readable medium may include instructions which represent various logic within the processor. When read by a machine, the instructions may cause the machine to fabricate the logic to perform the techniques described herein. Such representations, known as "IP cores," are reusable units of logic for an integrated circuit that may be stored on a tangible, machine-readable medium as a hardware model that describes the structure of the integrated circuit. The hardware model may be supplied to various customers or manufacturing facilities, which load the hardware model on fabrication machines that manufacture the integrated circuit. The integrated circuit may be fabricated such that the circuit performs operations described in association with any of the embodiments described herein.

Figure 11:
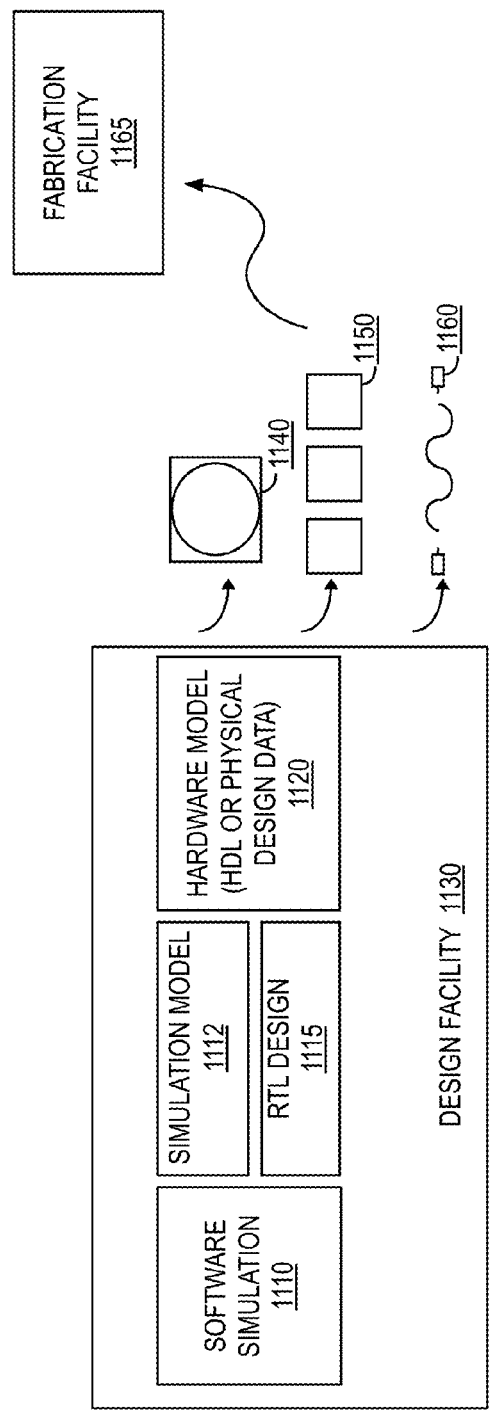
FIG. 11 is a block diagram illustrating an IP core development system that may be used to manufacture an integrated circuit to perform operations according to an embodiment.

FIG. 11 is a block diagram illustrating an IP core development system 1100 that may be used to manufacture an integrated circuit to perform operations according to an embodiment. The IP core development system 1100 may be used to generate modular, re-usable designs that can be incorporated into a larger design or used to construct an entire integrated circuit (e.g., an SOC integrated circuit). A design facility 1130 can generate a software simulation 1110 of an IP core design in a high level programming language (e.g., C/C++). The software simulation 1110 can be used to design, test, and verify the behavior of the IP core. A register transfer level (RTL) design can then be created or synthesized from the simulation model 1112. The RTL design 1115 is an abstraction of the behavior of the integrated circuit that models the flow of digital signals between hardware registers, including the associated logic performed using the modeled digital signals. In addition to an RTL design 1115, lower-level designs at the logic level or transistor level may also be created, designed, or synthesized. Thus, the particular details of the initial design and simulation may vary.

The RTL design 1115 or equivalent may be further synthesized by the design facility into a hardware model 1120, which may be in a hardware description language (HDL), or some other representation of physical design data. The HDL may be further simulated or tested to verify the IP core design. The IP core design can be stored for delivery to a 3rd party fabrication facility 1165 using non-volatile memory 1140 (e.g., hard disk, flash memory, or any non-volatile storage medium). Alternatively, the IP core design may be transmitted (e.g., via the Internet) over a wired connection 1150 or wireless connection 1160. The fabrication facility 1165 may then fabricate an integrated circuit that is based at least in part on the IP core design. The fabricated integrated circuit can be configured to perform operations in accordance with at least one embodiment described herein.

Exemplary System on a Chip Integrated Circuits

Figure 12:
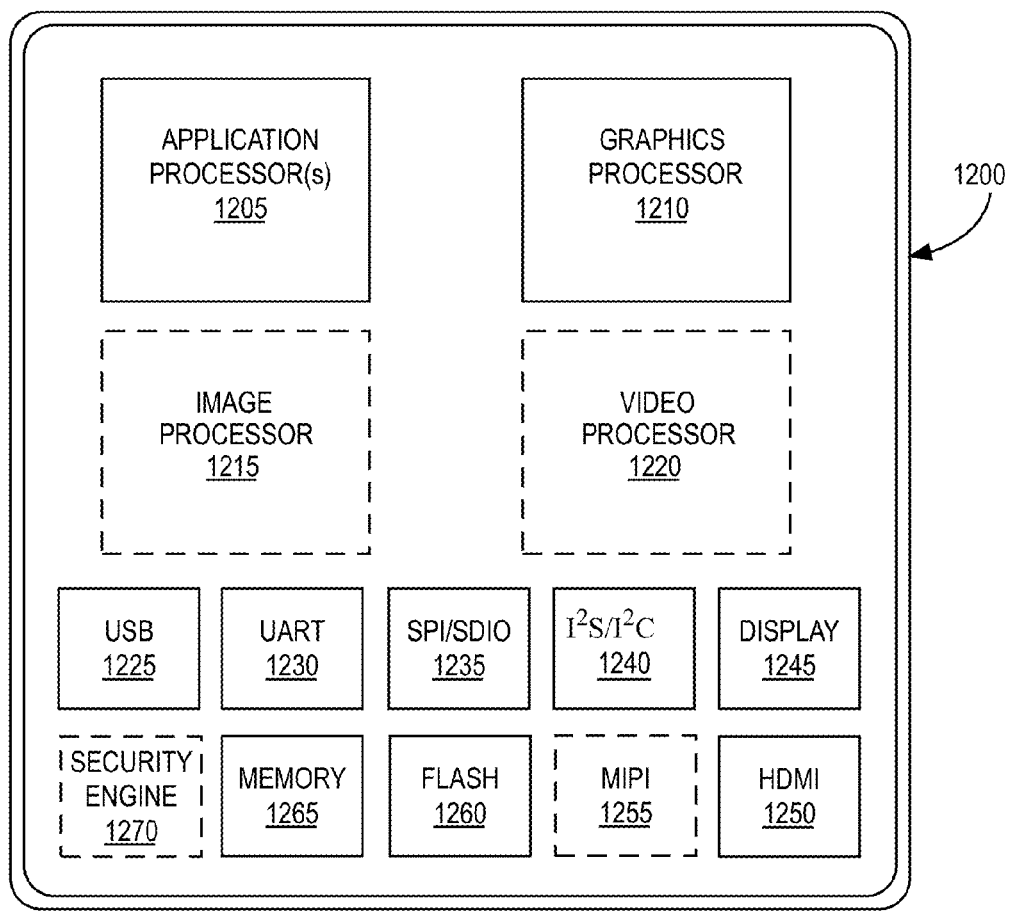
FIG. 12 is a block diagram illustrating an exemplary system on a chip integrated circuit that may be fabricated using one or more IP cores, according to an embodiment.
Figure 13:
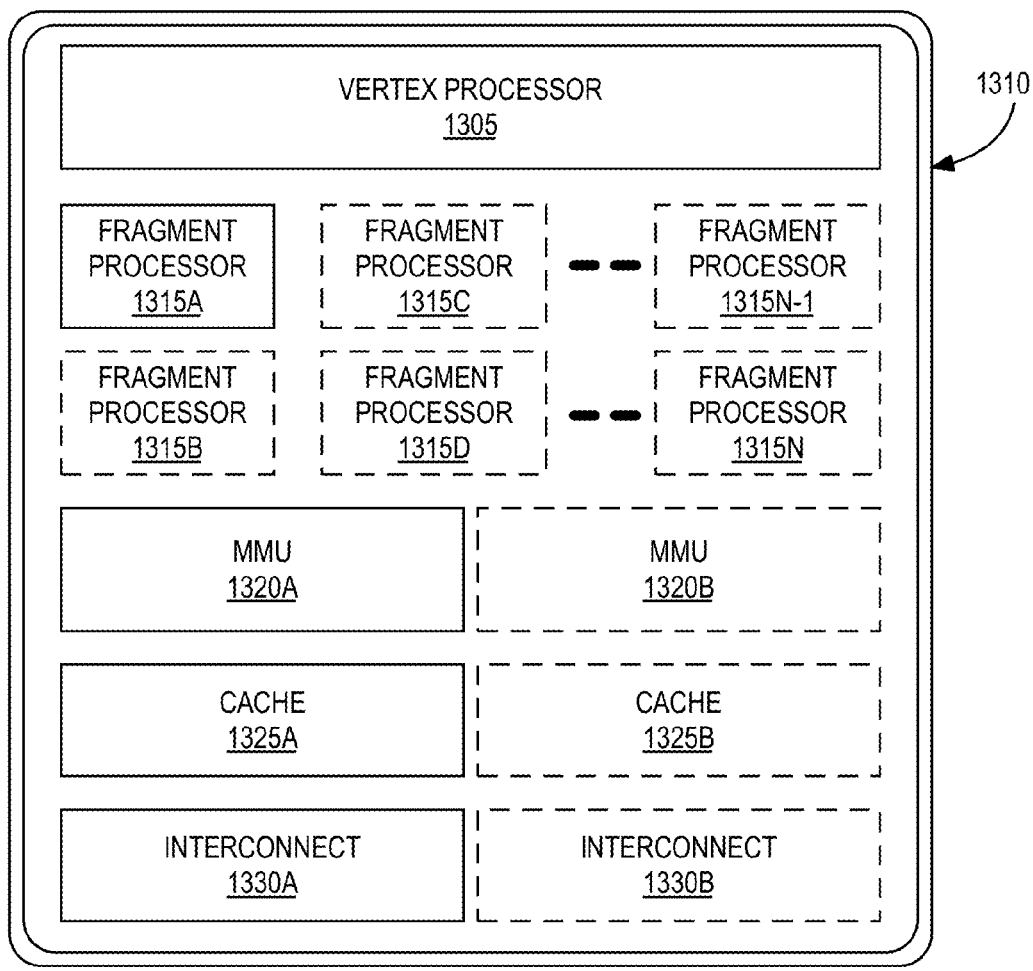
FIG. 13 is a block diagram illustrating an exemplary graphic processor of a system on a chip integrated circuit that may be fabricated using one or more IP cores, according to an embodiment.
Figure 14:
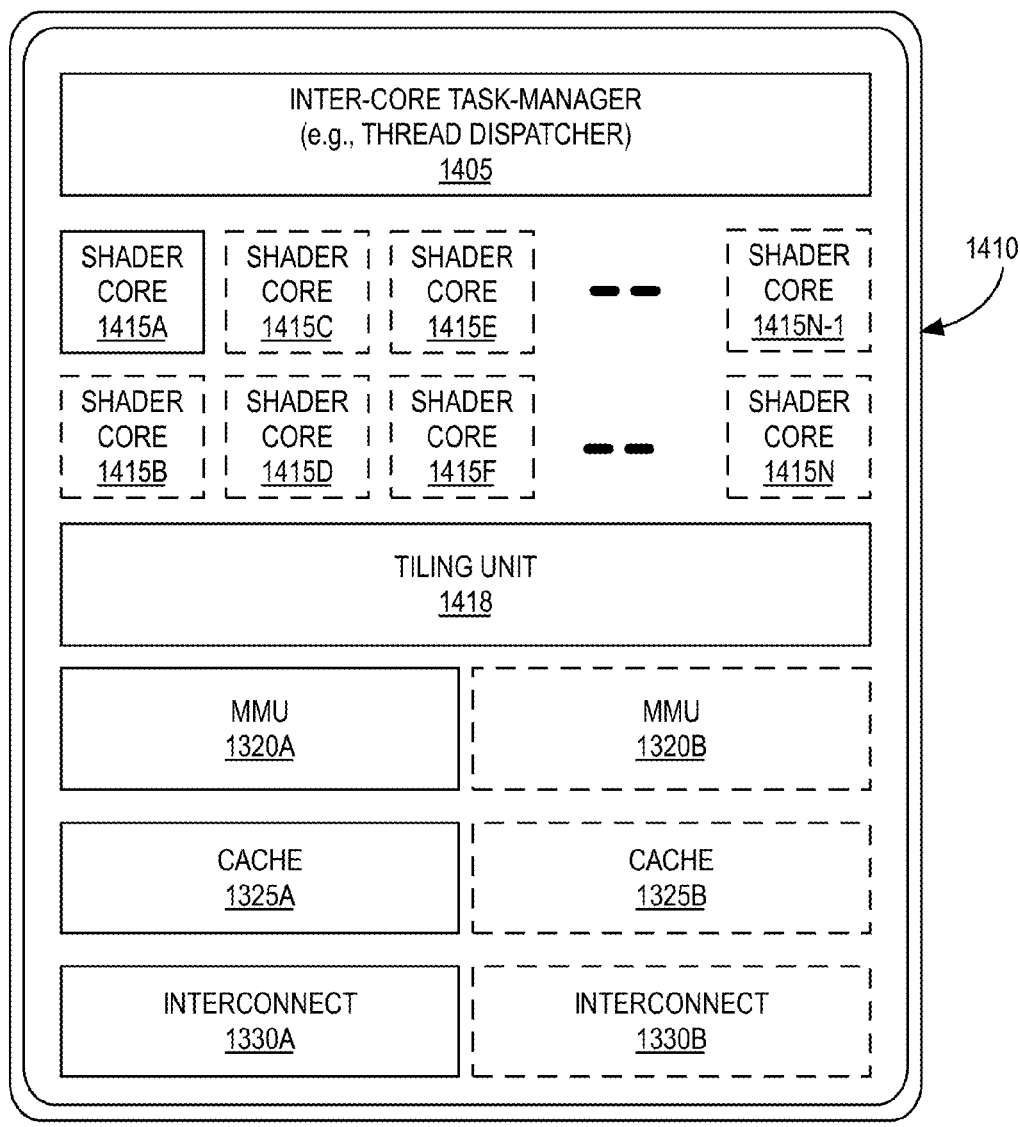
FIG. 14 is a block diagram illustrating an additional exemplary graphics processor of a system on a chip integrated circuit that may be fabricated using one or more IP cores, according to an embodiment.

FIGS. 12-14 illustrated exemplary integrated circuits and associated graphics processors that may be fabricated using one or more IP cores, according to various embodiments described herein. In addition to what is illustrated, other logic and circuits may be included, including additional graphics processors/cores, peripheral interface controllers, or general purpose processor cores.

FIG. 12 is a block diagram illustrating an exemplary system on a chip integrated circuit 1200 that may be fabricated using one or more IP cores, according to an embodiment. Exemplary integrated circuit 1200 includes one or more application processor(s) 1205 (e.g., CPUs), at least one graphics processor 1210, and may additionally include an image processor 1215 and/or a video processor 1220, any of which may be a modular IP core from the same or multiple different design facilities. Integrated circuit 1200 includes peripheral or bus logic including a USB controller 1225, UART controller 1230, an SPI/SDIO controller 1235, and an I²S/I²C controller 1240. Additionally, the integrated circuit can include a display device 1245 coupled to one or more of a high-definition multimedia interface (HDMI) controller 1250 and a mobile industry processor interface (MIPI) display interface 1255. Storage may be provided by a flash memory subsystem 1260 including flash memory and a flash memory controller. Memory interface may be provided via a memory controller 1265 for access to SDRAM or SRAM memory devices. Some integrated circuits additionally include an embedded security engine 1270.

FIG. 13 is a block diagram illustrating an exemplary graphic processor 1310 of a system on a chip integrated circuit that may be fabricated using one or more IP cores, according to an embodiment. Graphics processor 1310 can be a variant of the graphics processor 1210 of FIG. 12. Graphics processor 1310 includes a vertex processor 1305 and one or more fragment processor(s) 1315A-1315N. Graphics processor 1310 can execute different shader programs via separate logic, such that the vertex processor 1305 is optimized to execute operations for vertex shader programs, while the one or more fragment processor(s) 1315A-1315N execute fragment (e.g., pixel) shading operations for fragment or pixel shader programs. The vertex processor 1305 performs the vertex processing stage of the 3D graphics pipeline and generates primitives and vertex data. The fragment processor(s) 1315A-1315N use the primitive and vertex data generated by the vertex processor 1305 to produce a framebuffer that is displayed on a display device. In one embodiment, the fragment processor(s) 1315A-1315N are optimized to execute fragment shader programs as provided for in the OpenGL API, which may be used to perform similar operations as a pixel shader program as provided for in the Direct 3D API.

Graphics processor 1310 additionally includes one or more memory management units (MMUs) 1320A-B, cache(s) 1325A-B, and circuit interconnect(s) 1330A-1330B. The one or more MMU(s) 1320A-1320B provide for virtual to physical address mapping for integrated circuit 1300, including for the vertex processor 1305 and/or fragment processor(s) 1315A-1315N, which may reference vertex or image/texture data stored in memory, in addition to vertex or image/texture data stored in the one or more cache(s) 1325A-1325B. In one embodiment the one or more MMU(s) 1325A-1325B may be synchronized with other MMUs within the system, including one or more MMUs associated with the one or more application processor(s) 1205, image processor 1215, and/or video processor 1220 of FIG. 12, such that each processor 1205-1220 can participate in a shared or unified virtual memory system. The one or more circuit interconnect(s) 1330A-1330B enable graphics processor 1310 to interface with other IP cores within the SoC, either via an internal bus of the SoC or via a direct connection, according to embodiments.

FIG. 14 is a block diagram illustrating an additional exemplary graphics processor 1410 of a system on a chip integrated circuit that may be fabricated using one or more IP cores, according to an embodiment. Graphics processor 1410 can be a variant of the graphics processor 1210 of FIG. 12. Graphics processor 1410 includes the one or more memory management units 1320A-1320B, caches 1325A-1325B, and circuit interconnects 1330A-1330B of the integrated circuit 1300 of FIG. 13.

Graphics processor 1410 includes one or more shader core(s) 1415A-1415N, which provides for a unified shader core architecture in which a single core or type or core can execute all types of programmable shader code, including vertex shaders, fragment shaders, and compute shaders. The exact number of shader cores present can vary among embodiments and implementations. Additionally, graphics processor 1410 includes an inter-core task manager 1405, which acts as a thread dispatcher to dispatch execution threads to one or more shader cores 1415A-1415N and a tiling unit 1418 to accelerate tiling operations for tile-based rendering, in which rendering operations for a scene are subdivided in image space, for example to exploit local spatial coherence within a scene or to optimize use of internal caches.

Additionally, other logic and circuits may be included in the processor of integrated circuit 1200, including additional graphics processors/cores, peripheral interface controllers, or general-purpose processor cores.

Caching for Pixel Synchronization-based Graphics Techniques

The cache based node compression logic described herein has general application to adaptive graphical effects algorithms used in adaptive shadowing and adaptive transparency techniques. One embodiment provides logic that is particularly adaptive for use with adaptive volumetric shadowing (AVSM) and order independent transparency (OIT) algorithms that utilize pixel engine synchronization logic or raster order view (ROV) techniques which enable deterministic access to resources created with unordered access views (UAVs), which otherwise would be accessed in a non-deterministic manner.

AVSM Overview

In adaptive volumetric shadow mapping (AVSM) an adaptively sampled representation of the volumetric transmittance in a shadow-map-like data structure is generated. Each texel of this shadow map stores a compact approximation of the transmittance curve along the corresponding light ray. A streaming, lossy compression algorithm is used that is capable of generating a constant-storage, variableerror representation of visibility that can be used in later shadow lookups. Pixel synchronization can be used serialize read-modify-write access to unordered access views, allowing the AVSM algorithm build a compressed node version directly from incoming fragments, as no two shaders will access the same pixel at the same time, ensuring ordered and deterministic access to pixel data.

AVSM includes a compression stage compute a compressed transmittance curve. Compressing the transmittance curve reduces memory consumption and bandwidth consumption while making the subsequent lookup of the transmittance values more efficient. In general, the number of transparent fragments at a pixel will be larger than the number of resultant compressed AVSM nodes. A streaming compression algorithm can be used to generate a compressed transmittance curve that approximates the original curve, as shown in FIGS. 15A-C.

Figure 15A:
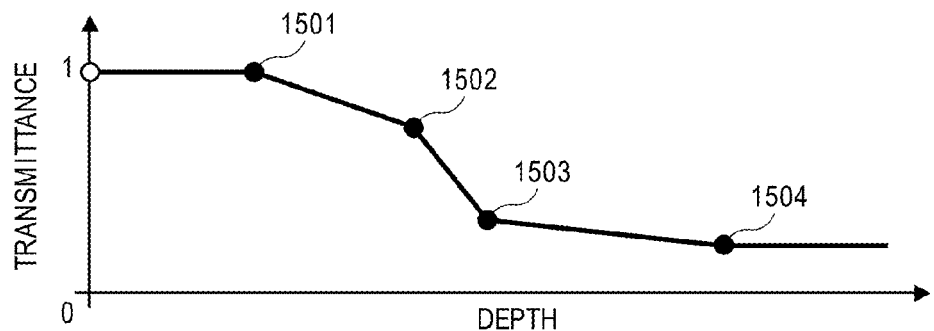
FIGS. 15A-C are illustrations of adaptive volumetric shadow mapping node compression.
Figure 15B:
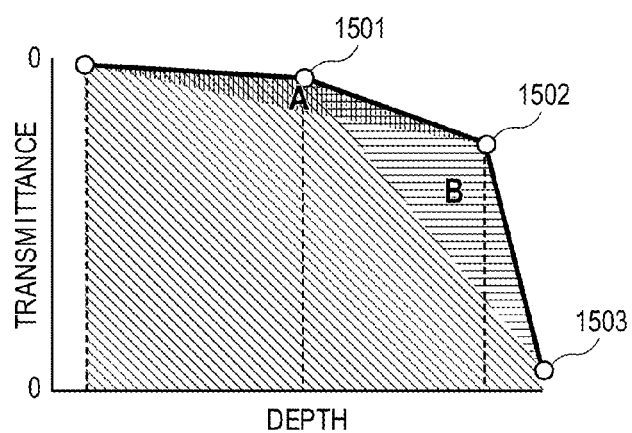
Figure 15C:
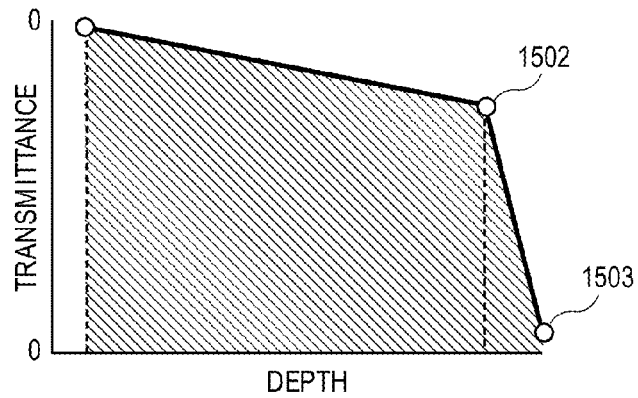

FIGS. 15A-C are illustrations of adaptive volumetric shadow mapping node compression 1500. Adaptive volumetric shadow maps encode a fraction of visible light from a light source over an interval [0, 1] as a function of depth at each texel. This quantity is referred to as transmittance and defines an attenuation function that represents the amount of light absorbed or scattered along a light ray. Each texel stores a fixed-size array of irregularly-placed samples of the transmittance function. Array elements are used to specify a set of nodes that define an approximation of the transmittance function of an occluder. As illustrated in FIG. 15A, a set of nodes (node 1501-node 1504) are defined, where each node stores a pair of depth and transmittance values. Two or more nodes can be defined per texel, with a greater number of node allowing more complex transparency.

In any non-trivial scene the number of occluder insertions will generate more nodes than it is possible to store in a shadow map texel. To maintain a fixed or near-fixed memory cost, a streaming compression algorithm is performed in the input nodes to reduce the storage cost for the nodes to a pre-defined value by removing the nodes with the least overall impact on the fidelity of the transmittance approximation for the occluder. Area preserving metrics are used to determine and remove the node that results in the smallest variation to the integral of the transmittance curve.

As illustrated in FIG. 15B, an exemplary compression pass has determined to reduce the four input nodes (node 1501-node 1504) to three input nodes (node 1501-node 1503). Using area preserving metrics, it can be determined that the removal of node 1504 would result in the least impact to the transmittance approximation represented by the nodes. If necessary, an additional compression pass can be performed in which the area loss resulting from the removal of node 1501 is compared with the area loss resulting from the removal of node 1502.

As illustrated in FIG. 15C, should the fixed memory targets require the removal of an additional node, node 1501 can be removed, leaving node 1502, as the resulting loss of fidelity is less significant than the loss resulting from the removal of node 1502.

Once the compression process is complete, the compressed nodes in the resulting shadow map can be sampled to render shadowed object for a scene.

Adaptive Transparency Overview

Adaptive transparency is an implementation of order-independent transparency that approximates the ground-truth results obtained with A-buffer compositing while operating in bounded memory and exhibiting consistent performance. An adaptively compressed visibility representation can be constructed and sampled or queried to support a wide range and combination of transparent geometry. The compression implemented for adaptive transparency is similar to the transmittance function node compression performed for AVSM. The visibility function for transparent surfaces is comprised of many instantaneous reductions in transmittance. Nodes defining an approximation of transmittance as a function of depth for a fragment or pixel can be inserted into an array. Nodes can be removed as needed, where the node with the least impact on the integration over the visibility function is removed, as shown in FIGS. 16A-B.

Figure 16A:
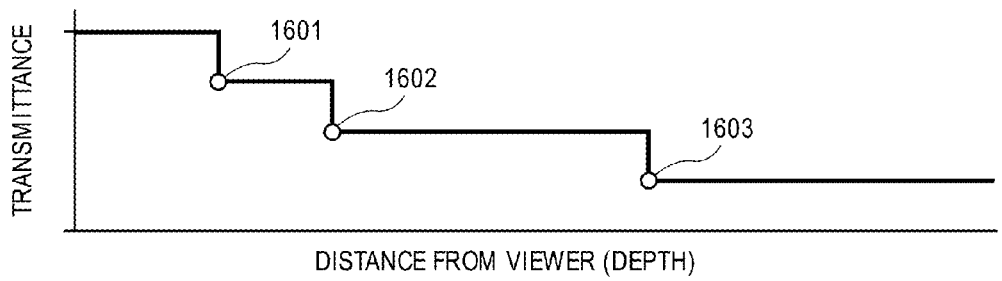
FIGS. 16A-B are illustrations of adaptive transparency node compression.
Figure 16B:
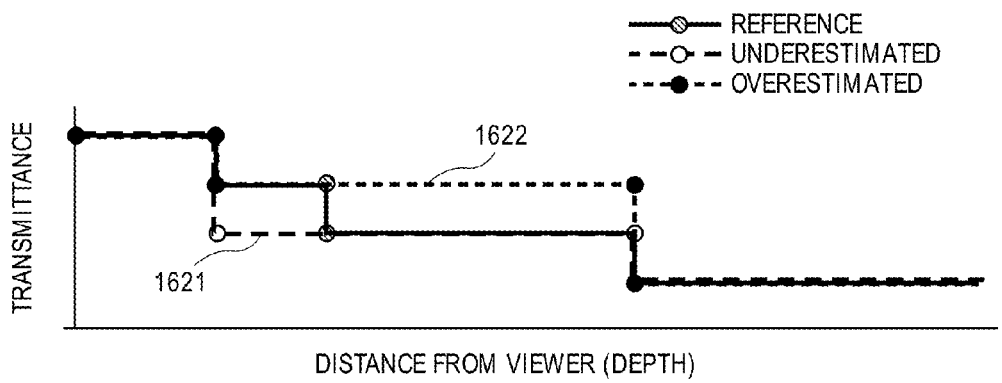

FIGS. 16A-B are illustrations of adaptive transparency node compression 1600. FIG. 16A illustrates a set of nodes (node 1601-node 1603) representing an approximation of the transmittance function for a transparent surface. FIG. 16B illustrates multiple potential compressions of the approximation resulting from the removal of a node. There are two alternative ways of eliminating a node. In some instances, if a node is simply removed from the representation, the resulting compressed visibility function produces an overestimate 1622 of the uncompressed transmittance. It is possible to produce an underestimate 1621 by modifying the transmittance of the node previous to the removed node.

Once the transparency function node is compressed, the compressed node can be stored and sampled by pixel or fragment shading logic to produce an adaptive transparency effect when rendering a scene.

Caching Techniques

Embodiments described herein provide graphics processing logic that uses a transmittance node cache caching and specialized cache flushing logic that enhances the use of parallelism when performing transmittance node compression for adaptive shadow and transparency techniques. The node caching enhances parallelism by enabling multiple node insertions and compressions to be performed in parallel. Additionally, thread divergence on the graphics processor is reduced by synchronizing the branching paths taken by different threads executing on the same graphics processor execution unit. Examples are provided with respect to AVSM. However, the technique described herein are applicable to adaptive transparency approximation as well. In some instances the benefits to applying the caching mechanism described herein may result in greater improvements relative to AVSM due to the larger sized datasets used in adaptive transparency.

Figure 17:
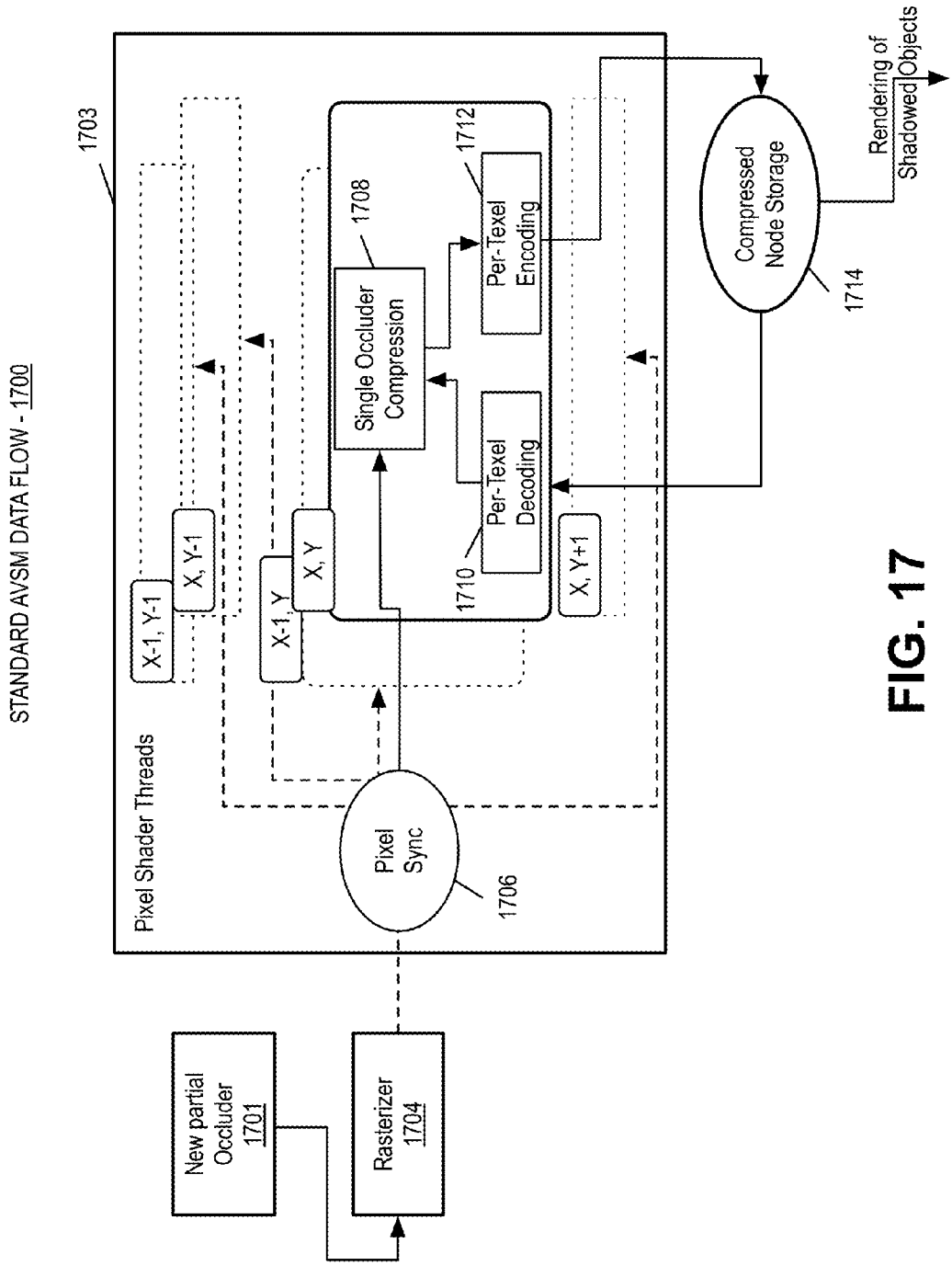
FIG. 17 shows an exemplary standard AVSM data flow.

FIG. 17 shows an exemplary standard AVSM data flow 1700. For AVSM algorithms known in the art, a representation of the transmittance curve is stored in nodes in which indicate a depth location along a light ray and a transmittance at that depth. To insert a new node defining information for a partial occluder, pixel shader logic loads the dataset of nodes into shader registers using unordered access views (UAVs). Once the dataset is loaded, a new occluder is added, transmittance values are recalculated, the least important node is removed, and the dataset is then stored back using UAVs. During this processes, the illustrated data flow occurs.

As shown at block 1701, a new partial occluder is added by a pixel shader thread. Each insertion adds two nodes worth of data, a volume ray entry point, a volume ray exit point, and and associated increase in occlusion. Rasterizer logic 1704 couples with pixel synchronization logic 1706 to synchronize data access to the various pixels of the scene. The pixel synchronization logic 1706 enables multiple pixel shader threads 1703 to operate on UAVs in parallel while modifying data in a deterministic manner. In general, access to UAVs is unordered, which means that the API providing access to the UAV does not guarantee that accesses will become visible in any particular order. The pixel synchronization logic 1706 enables UAV access to be at least deterministic, in that the order of execution for pixel shader threads will be the same across frames.

For each new partial occluder inserted at block 1701, standard AVSM algorithms perform single occluder compression 1708, as described above in FIGS. 15A-C, or as in FIGS. 16A-B is adaptive transparency is being performed. The compressed node dataset is loaded from compressed node storage 1714 and a per-texel decoding 1710 is performed. The new partial occluder is inserted into the data set and single occluder compression 1708 is performed. The compressed set of nodes undergo per-texel encoding 1712 and are then stored back to compressed node storage 1714. The compressed node storage 1714 is sampled by pixel shader logic during the rendering of shadowed objects.

Figure 18:
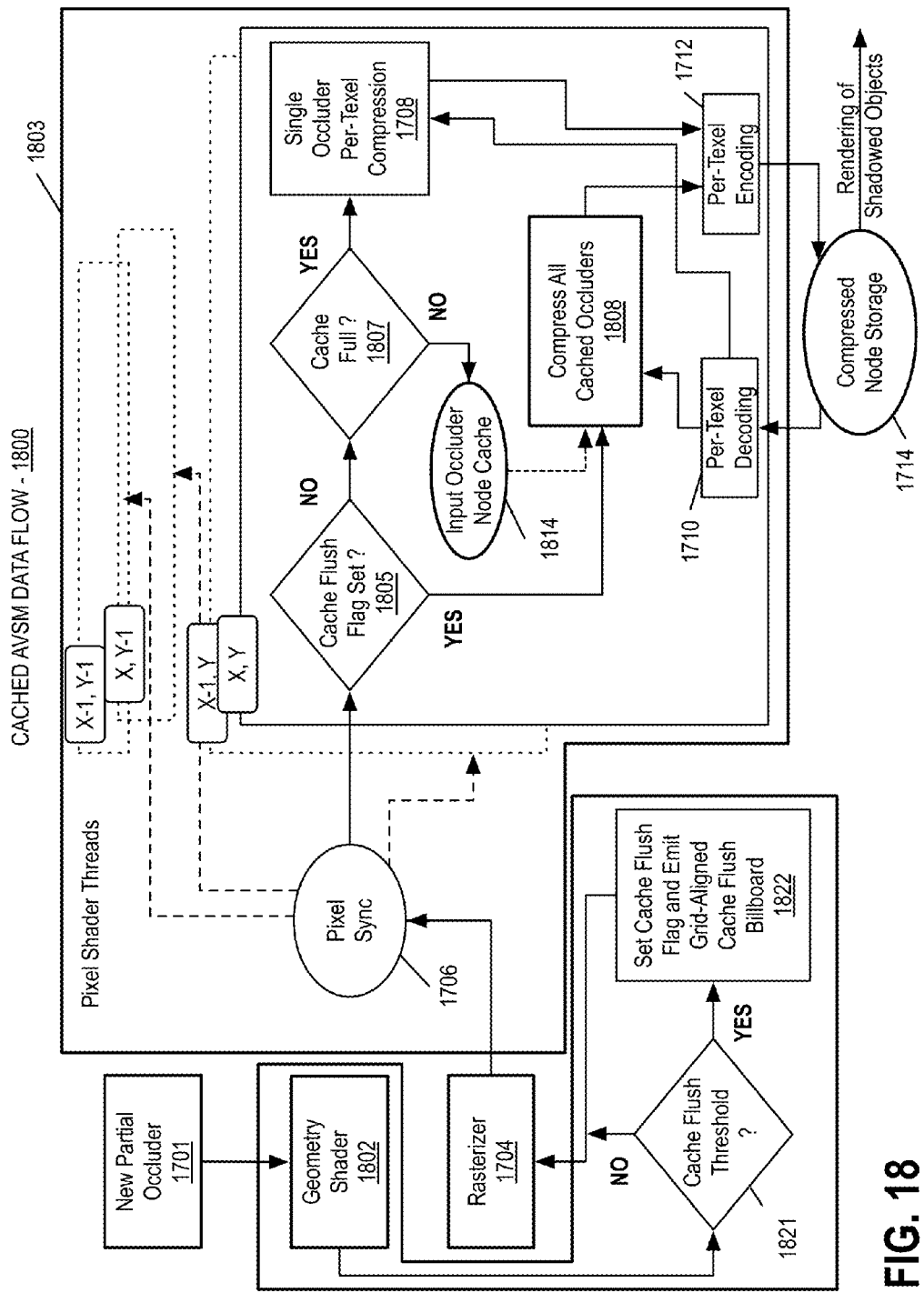
FIG. 18 shows a cached AVSM data flow, according to an embodiment.

FIG. 18 shows a cached AVSM data flow 1800, according to an embodiment. In one embodiment, the cached AVSM data flow includes a geometry shader 1802 and an input occluder node cache 1814. When a new partial occluder is added at block 1701, logic in the geometry shader 802 determines if the addition of the new occluder would trigger a cache flush threshold, as determined at 1821. If the cache flush threshold has been met, the geometry shader 1802 sets a cache flush flag and emits a grid-aligned cache flush billboard at block 1822. The cache flush billboard is an grid-aligned quad (e.g., square) which is camera facing and centered on the occluder. In one embodiment the cache flush threshold is based on a multiple of the node cache size. The cache flush billboard sets a special flag in the output interpolants. The flag is recognized by the Pixel Shader threads 1803 at block 1805. The cache flush flag activates a recompression branch to compress the cached occluders, as shown at block 1808. The cache flush process can occur multiple times within a single draw call.

The cache flush branch path has an early exit for empty cache pixels. Otherwise, at block 808, the pixel shader reads from compressed node storage 1714. The sheer can perform per-texel decoding of the compressed storage 1714 and compress all previously cached nodes in the input occluder node cache 1814. The total dataset of compressed nodes now includes the newly compressed nodes from the input occluder node cache 1814. She shader can then perform per-texel encoding 1712 on the compressed node data and write out the compressed dataset to compressed node storage 1714. As this branch is taken by all threads of the pixel shader executing the billboard quad, there is no thread branch divergence and the only additional cost is the branching instruction. In one embodiment, the bounding box around the current particle billboard's clip space position is calculated and aligned to 32×32 boundaries and enlarged by 1 in each direction, which may also cover the area of nearby particles and reduce global thread decoherence for regular particles which follow.

In one embodiment a per-pixel cache is used in which a separate section of the input occluder node cache 1814 is used by each one of the pixel shader threads 1803. Accordingly, it may be possible for the cache associated with one thread to become full before the cache associated with another thread becomes full. In the event a cache flush event does not occur before the input occluder node cache 1814 for a thread becomes full, as determined at block 1807, the pixel shader thread can temporarily fall back into single occluder per-texel compression 1708 as illustrated in FIG. 17, until a cache flush event occurs.

While in one embodiment pixel shader threads that execute the billboard quad are coherent, in one embodiment a SIMD thread ballot/vote instruction is enabled on the graphics processor, such that if a cache flush condition is met by any shader thread within a thread group, all other threads in the group can take the flush path in lockstep instead, further reduce general divergence. Such embodiment enables lower granularity cache flushing and simplified shader code, as the cache full fallback to the single occluder per-texel compression 1708 can be avoided.

The size of the input occluder node cache 1814 can vary among embodiments, and an incrementally larger cache size results an an incremental increase in performance due to reduced memory bandwidth consumption caused by less frequent recompression, which occurs during each cache flush instead of each insertion.

In one embodiment the caching methodology described herein is applied to adaptive transparency. In adaptive transparency, reducing memory bandwidth consumption provides significant benefits, as the node data includes RGB, alpha, and depth information, and high dynamic range values may be supported. Additionally, adaptive transparency, as used to implement order independent transparency, is heavily weighted towards node insertion cost, as the rendering component has low cost relative to insertion. Accordingly, reducing insertion cost directly reduces the global resource cost to implement adaptive transparency.

In one embodiment, the cache flush mechanisms used for adaptive transparency may differ in some embodiments. For example, instead of using a geometry shader to emit a cache flush billboard, a custom flush billboard can be inserted via an application processor by the particle system renderer. Additionally, a full-screen billboard quad can be emitted to flush the entire cache during or between draw calls, instead of the localized approached used for adaptive shading.

Figure 19:
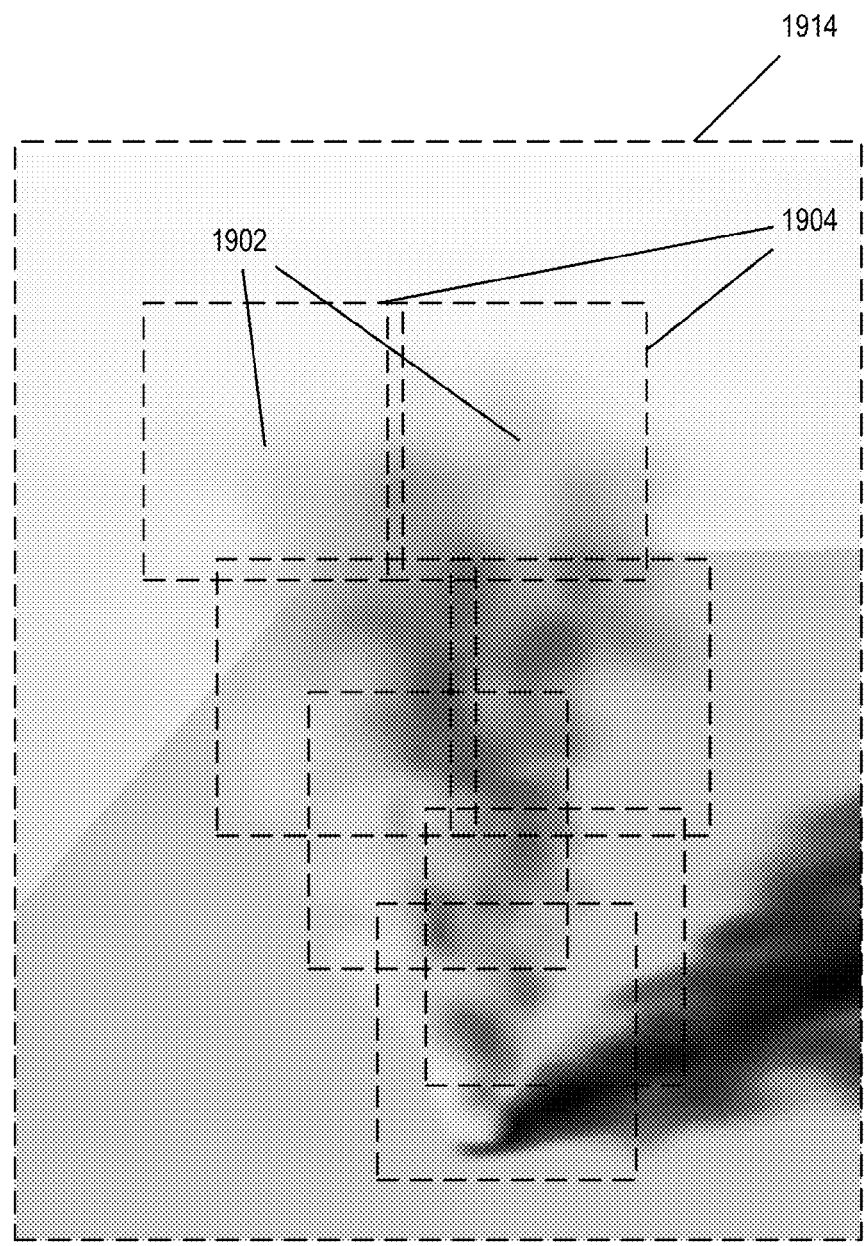
FIG. 19 illustrates exemplary cache flush billboards for volumetric particles, according to embodiments.

FIG. 19 illustrates exemplary cache flush billboards 1900 for volumetric particles, according to embodiments. In various embodiments, geometry shader logic or application processor particle system logic can draw a billboard quad 1904 centered on an occluder particle 1902. The pixel shader logic can interpret this billboard quad as a signal to flush the occluder node cache and perform a parallel compression operation on all cached occluder nodes within the pixels covered by the billboard quad. When the occluder cache is configured for use with adaptive transparency, a full screen billboard quad 1914 may be used to trigger a cache flush and recompression of all cached nodes. In one embodiment, as a substitute for billboard quads, tile-based flush mechanism may be used in which the occluder cache is flushed on a per-tile basis.

Figure 20:
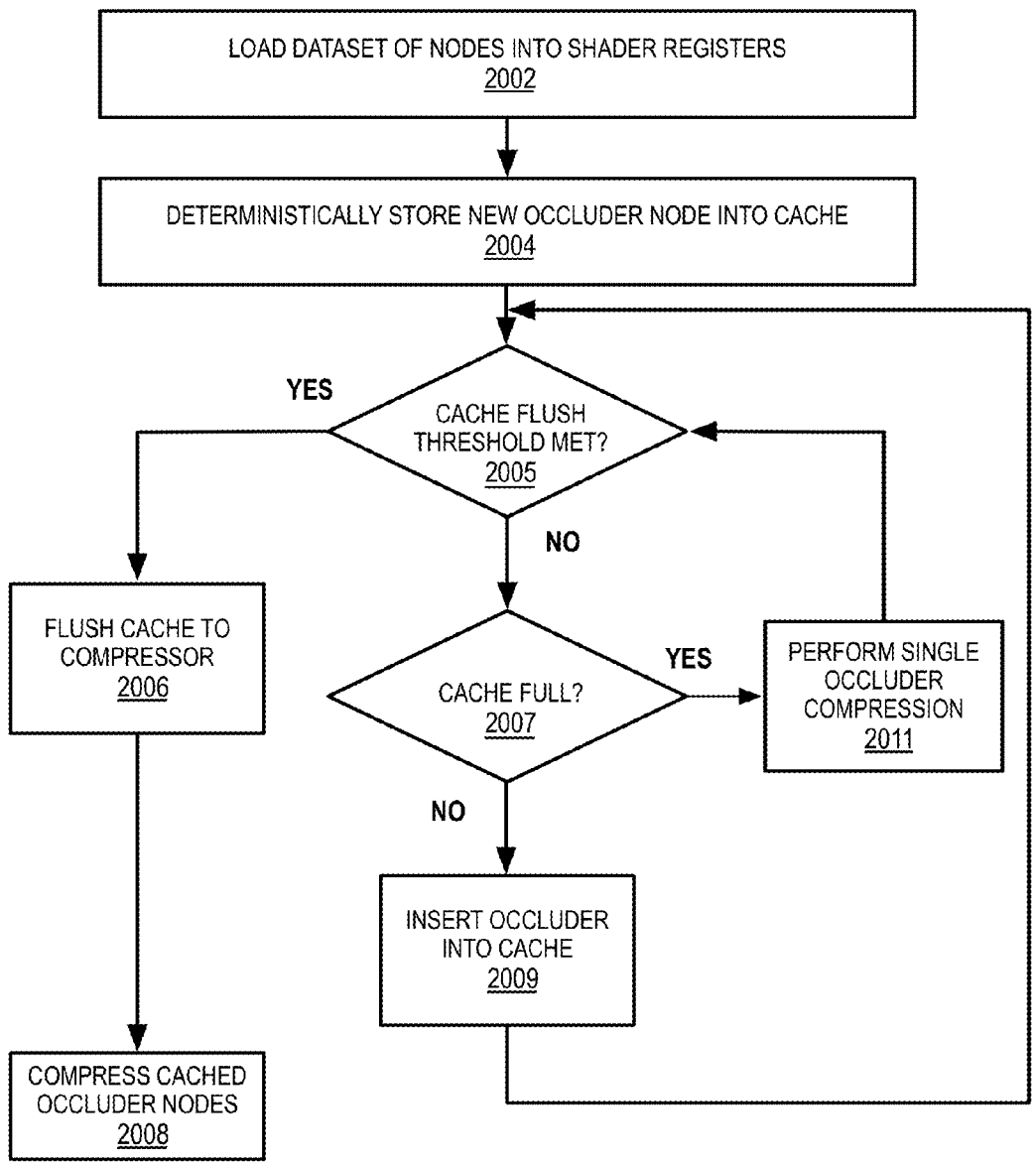
FIG. 20 is a flow diagram of cached based node compression logic, according to an embodiment.

FIG. 20 is a flow diagram of cached based node compression logic 2000, according to an embodiment. In one embodiment the cached based node compression logic 2000 is performed by a pixel processing engine including logic to process pixel or fragment shader instructions. The cache based node compression logic 2000 includes to load a dataset of nodes into shader (e.g., pixel shader, fragment shader) registers, as shown at block 2002. The dataset of nodes is loaded once per cache flush instead of once per occluder insertion as with techniques known in the art.

The cached based node compression logic 2000 additionally includes to deterministically store a new occluder node into an input occluder node cache at block 2004. In one embodiment the cache is a per-pixel cache and the new occluder node is stored into a per-pixel array of cached nodes. In one embodiment determinism is enabled via a per-pixel counter implemented as a texture stored in a UAV.

Access to the texture is performed using a raster order view (ROV), or another pixel synchronization technique to enable deterministic write/modify/read operations to the same data from multiple pixel shader threads.

At block 2005, the cached based node compression logic 2000 determines whether a cache flush threshold has been met. This determination may be performed using a geometry shader, as illustrated in FIG. 18. The precise flush threshold may be pre-configured based on certain parameters, such as the total size of the cache or the per-pixel cache allocation. If the cache flush threshold is not met at block 2005, the cached based node compression logic 2000 can determine if the cache is full at block 2007. If the cache is determined to be full at block 2007 then the logic can perform single occluder compression at block 2011. For single occluder compression, each new occluder node insertion, the new occluder is inserted and occluder data is re-compressed and written to compressed node storage instead of storing the data in the cache. Accordingly, once the cache becomes full, insertion of new occluder nodes into the cache is bypassed until the cache flush threshold is met at block 2005 and the occluder node compression process reverts to occurring once per-insertion. If the cache is not yet full at block 2007, the cached based node compression logic 2000 can insert the new occluder node into the cache at block 2009.

In one embodiment the cache flush threshold may be dynamically determined based on communication between a geometry shader thread and a pixel shader thread, such that a cache full state will not occur at block 2007. For example, using an interlocked or atomic operation provided by a shading language API (e.g., GLSL, HLSL), a pixel shader thread can write to a flag in memory that can be read by a geometry shader thread. The flag can indicate that the cache for a pixel or for a pixel shader thread is in a near-full state, which can cause the geometry shader to make a determination to flush the cache before the cache becomes full. In one embodiment this technique can be employed to avoid the reversion to single occluder compression at block 2011. In such embodiment, additional logic operations, such as tile-based flushing, may be performed to enable a deterministic cache flush frequency.

Once the cache flush threshold is met at block 2005, or a cache flush determination is otherwise made, cached data is flushed to occluder node compressor logic at block 2006. The occluder node compressor logic can then compressed cached occluder nodes at block 2008. The cache flush at block 2006 can be triggered via a billboard quad and/or via a tile-based flush, and can be a per-pixel cache flush or a complete full-screen recompression. The billboard cache flush can be triggered via a geometry shader as in FIG. 18 or via a particle rendering system executing on an application processor. A particle rendering system is included in a graphics driver associated with graphics processing logic provided by one embodiment. In one embodiment, the graphics processing logic supports a particle rendering system provided on a user mode graphics application executing on an application processor coupled to the graphics processing logic. In one embodiment, tile-based rendering logic can trigger a cache, either via fixed-function logic or tile-based shader logic, such as a tile-based pixel shader or fragment shader.

Figure 21:
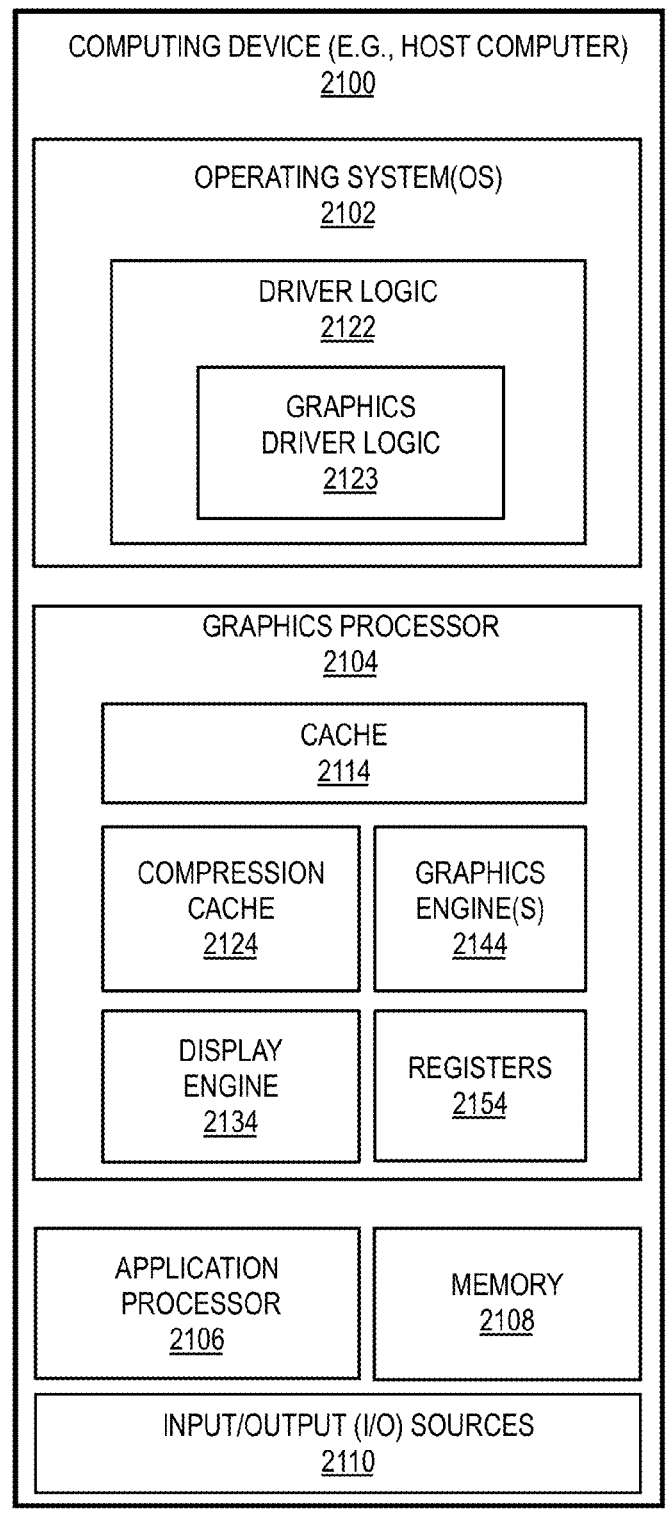
FIG. 21 is a block diagram of a computing device including a graphics processor, according to an embodiment

FIG. 21 is a block diagram of a computing device 2100 including a graphics processor 2104, according to an embodiment. The computing device 2100 can be a computing device such as the data processing system 100 as in of FIG. 1. The computing device 2100 may also be or be included within a communication device such as a set-top box (e.g., Internet-based cable television set-top boxes, etc.), global positioning system (GPS)-based devices, etc. The computing device 2100 may also be or be included within mobile computing devices such as cellular phones, smartphones, personal digital assistants (PDAs), tablet computers, laptop computers, e-readers, smart televisions, television platforms, wearable devices (e.g., glasses, watches, bracelets, smartcards, jewelry, clothing items, etc.), media players, etc. For example, in one embodiment, the computing device 2100 includes a mobile computing device employing an integrated circuit ("IC"), such as system on a chip ("SoC" or "SOC"), integrating various hardware and/or software components of computing device 2100 on a single chip.

The computing device 2100 includes a graphics processor 2104, which may be any graphics processor described herein. The graphics processor 2104 a compression cache 2124, as described in FIG. 18. The graphics processor also includes one or more graphics engine(s) 2144, which may include one or more instances of the graphics core 1800 of FIG. 18, or any graphics execution logic described herein, such as the execution logic 600 of FIG. 6. The graphics engine(s) 2144 include execution resources to execute geometry shader logic, pixel shader logic and/or fragment shader logic as described herein. The graphics processor 2104 also includes a set of registers 2154, including control registers to configure and control operations for the graphics processor 2104. The graphics processor 2104 also includes a display engine 2134 to couple the graphics processor to a display device. Data that is processed by the graphics processor 2104 is stored in a buffer within a hardware graphics pipeline and state information is stored in memory 2108. The resulting image is then transferred to a display controller of the display engine 2134 for output via a display device, such as the display device 319 of FIG. 3. The display device may be of various types, such as Cathode Ray Tube (CRT), Thin Film Transistor (TFT), Liquid Crystal Display (LCD), Organic Light Emitting Diode (OLED) array, etc., and may be configured to display information to a user.

As illustrated, in one embodiment, in addition to a graphics processor 2104, the computing device 2100 may further include any number and type of hardware components and/or software components, such as (but not limited to) an application processor 2106, memory 2108, and input/output (I/O) sources 2110. The application processor 2106 can interact with a hardware graphics pipeline, as illustrated with reference to FIG. 3, to share graphics pipeline functionality. The application processor 2106 can include one or processors, such as processor(s) 102 of FIG. 1, and may be the central processing unit (CPU) that is used at least in part to execute an operating system (OS) 2102 for the computing device 2100. The OS 2102 can serve as an interface between hardware and/or physical resources of the computer device 2100 and a user. The OS 2102 can include driver logic 2122 for various hardware devices in the computing device 2100. The driver logic 2122 can include graphics driver logic 2123 such as the user mode graphics driver 1026 and/or kernel mode graphics driver 1029 of FIG. 10. In one embodiment the graphics driver logic 2123 is configured to initialize the graphics microcontroller 2144 and can load firmware or scheduling logic into the graphics microcontroller 2144. In one embodiment the graphics driver logic 2123 also includes scheduling logic and can perform scheduling operations for the one or more graphics engine(s) 2134 in the absence of the graphics microcontroller 2144, which may be excluded from some embodiments.

It is contemplated that in some embodiments, the graphics processor 2104 may exist as part of the application processor 2106 (such as part of a physical CPU package) in which case, at least a portion of the memory 2108 may be shared by the application processor 2106 and graphics processor 2104, although at least a portion of the memory 2108 may be exclusive to the graphics processor 2104, or the graphics processor 2104 may have a separate store of memory. The memory 2108 may comprise a pre-allocated region of a buffer (e.g., framebuffer); however, it should be understood by one of ordinary skill in the art that the embodiments are not so limited, and that any memory accessible to the lower graphics pipeline may be used. The memory 2108 may include various forms of random access memory (RAM) (e.g., SDRAM, SRAM, etc.) comprising an application that makes use of the graphics processor 2104 to render a desktop or 3D graphics scene. A memory controller hub, such as memory controller hub 116 of FIG. 1, may access data in the memory 2108 and forward it to graphics processor 2104 for graphics pipeline processing. The memory 2108 may be made available to other components within the computing device 2100. For example, any data (e.g., input graphics data) received from various I/O sources 2110 of the computing device 2100 can be temporarily queued into memory 2108 prior to their being operated upon by one or more processor(s) (e.g., application processor 2106) in the implementation of a software program or application. Similarly, data that a software program determines should be sent from the computing device 2100 to an outside entity through one of the computing system interfaces, or stored into an internal storage element, is often temporarily queued in memory 2108 prior to its being transmitted or stored.

The I/O sources can include devices such as touchscreens, touch panels, touch pads, virtual or regular keyboards, virtual or regular mice, ports, connectors, network devices, or the like, and can attach via an input/output (I/O) control hub (ICH) 130 as referenced in FIG. 1. Additionally, the I/O sources 2110 may include one or more I/O devices that are implemented for transferring data to and/or from the computing device 2100 (e.g., a networking adapter); or, for a large-scale non-volatile storage within the computing device 2100 (e.g., hard disk drive). User input devices, including alphanumeric and other keys, may be used to communicate information and command selections to graphics processor 2104. Another type of user input device is cursor control, such as a mouse, a trackball, a touchscreen, a touchpad, or cursor direction keys to communicate direction information and command selections to GPU and to control cursor movement on the display device. Camera and microphone arrays of the computer device 2100 may be employed to observe gestures, record audio and video and to receive and transmit visual and audio commands.

I/O sources 2110 configured as one or more network interface(s) can provide access to a network, such as a LAN, a wide area network (WAN), a metropolitan area network (MAN), a personal area network (PAN), Bluetooth, a cloud network, a cellular or mobile network (e.g., 3$^{rd}$ Generation (3G), 4th Generation (4G), etc.), an intranet, the Internet, etc. Network interface(s) may include, for example, a wireless network interface having one or more antenna(e). Network interface(s) may also include, for example, a wired network interface to communicate with remote devices via network cable, which may be, for example, an Ethernet cable, a coaxial cable, a fiber optic cable, a serial cable, or a parallel cable.

Network interface(s) may provide access to a LAN, for example, by conforming to IEEE 802.11 standards, and/or the wireless network interface may provide access to a personal area network, for example, by conforming to Bluetooth standards. Other wireless network interfaces and/or protocols, including previous and subsequent versions of the standards, may also be supported. In addition to, or instead of, communication via the wireless LAN standards, network interface(s) may provide wireless communication using, for example, Time Division, Multiple Access (TDMA) protocols, Global Systems for Mobile Communications (GSM) protocols, Code Division, Multiple Access (CDMA) protocols, and/or any other type of wireless communications protocols.

It is to be appreciated that a lesser or more equipped system than the example described above may be preferred for certain implementations. Therefore, the configuration of the computing device 2100 may vary from implementation to implementation depending upon numerous factors, such as price constraints, performance requirements, technological improvements, or other circumstances. Examples include (without limitation) a mobile device, a personal digital assistant, a mobile computing device, a smartphone, a cellular telephone, a handset, a one-way pager, a two-way pager, a messaging device, a computer, a personal computer (PC), a desktop computer, a laptop computer, a notebook computer, a handheld computer, a tablet computer, a server, a server array or server farm, a web server, a network server, an Internet server, a work station, a mini-computer, a main frame computer, a supercomputer, a network appliance, a web appliance, a distributed computing system, multiprocessor systems, processor-based systems, consumer electronics, programmable consumer electronics, television, digital television, set top box, wireless access point, base station, subscriber station, mobile subscriber center, radio network controller, router, hub, gateway, bridge, switch, machine, or combinations thereof.

Embodiments may be implemented as any one or a combination of: one or more microchips or integrated circuits interconnected using a parent-board, hardwired logic, software stored by a memory device and executed by a microprocessor, firmware, an application specific integrated circuit (ASIC), and/or a field programmable gate array (FPGA). The term "logic" may include, by way of example, software or hardware and/or combinations of software and hardware.

Embodiments may also provided, for example, as a computer program product which may include one or more machine-readable media having stored thereon machine-executable instructions that, when executed by one or more machines such as a computer, network of computers, or other electronic devices, may result in the one or more machines carrying out operations in accordance with embodiments described herein. A machine-readable medium may include, but is not limited to, floppy diskettes, optical disks, CD-ROMs (Compact Disc-Read Only Memories), and magneto-optical disks, ROMs, RAMs, EPROMs (Erasable Programmable Read Only Memories), EEPROMs (Electrically Erasable Programmable Read Only Memories), magnetic or optical cards, flash memory, or other type of media/machine-readable medium suitable for storing machine-executable instructions. Moreover, embodiments may be downloaded as a computer program product, wherein the program may be transferred from a remote computer (e.g., a server) to a requesting computer (e.g., a client) by way of one or more data signals embodied in and/or modulated by a carrier wave or other propagation medium via a communication link (e.g., a modem and/or network connection).

The following clauses and/or examples pertain to specific embodiments or examples thereof. Specifics in the examples may be used anywhere in one or more embodiments. The various features of the different embodiments or examples may be variously combined with some features included and others excluded to suit a variety of different applications. Examples may include subject matter such as a method, means for performing acts of the method, at least one machine-readable medium including instructions that, when performed by a machine cause the machine to performs acts of the method, or of an apparatus or system according to embodiments and examples described herein. Various components can be a means for performing the operations or functions described.

In general, embodiment described herein combines a caching system with special cache flushing methods aimed at reducing thread divergence across a group of threads in a thread group, in order to synchronize branching paths taken by different threads executing on the same graphics processor execution unit, One embodiment provides for a graphics processing apparatus comprising graphics execution logic to execute one or more threads of a graphics shader program; an occluder cache to store input occluder node data for adaptive graphical effects logic of the graphics shader program; and compression logic to compress input occluder node data stored in the occluder cache. The occluder node data, in one embodiment, includes occlusion data for use with adaptive shadowing or transparency logic.

One embodiment provides for a graphics processing method comprising loading a dataset of nodes into registers associated with a shader program executing on a graphics processor; deterministically storing a new occluder node into an input occluder node cache; flushing the input occluder node cache to compress input occluder nodes stored in the input occluder node cache; and storing compressed occluder node data into compressed node storage. In one embodiment the method additionally comprises loading the dataset of nodes into the registers associated with the shader program from the compressed node storage. Loading the dataset, in one embodiment, occurs once per flush, as opposed to once per insertion as in adaptive shadow mapping and transparency algorithms known in the art. In the event that the input occluder node cache becomes full, the method includes performing single occluder compression on the new occluder node instead of storing the node in the input occluder node cache for later compression. In one embodiment the input occluder node cache is a per-pixel cache, multiple threads of the shader program execute on multiple pixels in parallel, and the method additionally comprises synchronizing operations to a single pixel by multiple threads of the shader program via pixel synchronization logic of the graphics processor.

One embodiment provides for a system on a chip integrated circuit comprising a first processor to execute a particle rendering system and a second processor including graphics execution resources to execute one or more shader programs associated with the particle rendering system, wherein multiple threads of the one or more shader programs to deterministically insert occluder node data into an occluder node cache on the second processor and flush the occluder node cache to compress cached occluder node data and store compressed occluder node data to compressed node storage.

Those skilled in the art will appreciate from the foregoing description that the broad techniques of the embodiments can be implemented in a variety of forms. Therefore, while the embodiments have been described in connection with particular examples thereof, the true scope of the embodiments should not be so limited since other modifications will become apparent to the skilled practitioner upon a study of the drawings, specification, and following claims.

What is claimed is:

1. A graphics processing apparatus comprising:
graphics execution logic to execute one or more threads of a graphics shader program; an occluder cache to store input occluder node data for adaptive graphical effects logic
of the graphics shader program;
compression logic to compress input occluder node data stored in the occlude cache in response to a cache flush event; and
geometry shader logic to execute on the graphics execution logic, the geometry shader logic to trigger the cache flush event.

2. The graphics processing apparatus as in claim 1, additionally including compressed node storage to store compressed occluder node data output from the compression logic.

3. The graphics processing apparatus as in claim 1, the graphics execution logic to execute multiple threads of the graphics shader program.

4. The graphics processing apparatus as in claim 3, additionally including pixel synchronization logic to synchronize access to pixel data by the multiple threads.

5. The graphics processing apparatus as in claim 4, the multiple threads of the graphics shader program to deterministically insert multiple occluder nodes for a pixel via the pixel synchronization logic.

6. The graphics processing apparatus as in claim 1, wherein the adaptive graphical effects logic includes adaptive volumetric shadow mapping logic.

7. The graphics processing apparatus as in claim 1, wherein the adaptive graphical effects logic includes adaptive transparency logic.

8. A non-transitory machine-readable medium storing instructions which, when executed, cause one or more processors to perform operations comprising:
loading a dataset of nodes into registers associated with a shader program executing on a graphics processor;
deterministically storing a new occluder node into an input occluder node cache; flushing the input occluder node cache to compress input occluder nodes stored in the
input occluder node cache; and
storing compressed occluder node data into compressed node storage.

9. The non-transitory machine-readable medium as in claim 8, the operations additionally comprising loading the dataset of nodes into the registers associated with the shader program from the compressed node storage.

10. The non-transitory machine-readable medium as in claim 8, the operations additionally comprising loading the dataset of nodes into the registers associated with the shader program from the compressed node storage once per cache flush.

11. The non-transitory machine-readable medium as in claim 8, the operations additionally comprising determining that the input occluder node cache is full and performing single occluder compression on the new occluder node.

12. The non-transitory machine-readable medium as in claim 8, wherein the input occluder node cache is a per-pixel cache, multiple threads of the shader program execute on multiple pixels in parallel, and the operations additionally comprise synchronizing operations to a single pixel by multiple threads of the shader program via pixel synchronization logic of the graphics processor.

13. A system on a chip integrated circuit comprising: a first processor to execute a particle rendering system; and a second processor including graphics execution resources to execute one or more shader programs associated with the particle rendering system, wherein multiple threads of the one or more shader programs to deterministically insert occluder node data into an occluder node cache on the second processor and flush the occluder node cache to compress cached occluder node data and store compressed occluder node data to compressed node storage.

14. The system on a chip integrated circuit as in claim 13, further comprising a display engine to couple to a display device, the display engine to output pixel data generated by the second processor in association with the particle rendering system.

15. The system on a chip integrated circuit as in claim 13, the particle rendering system to cause the multiple threads of the one or more shader programs to flush of the occluder node cache via insertion of a cache flush billboard quad.

16. The system on a chip integrated circuit as in claim 13, the multiple threads of the one or more shader programs including at least one geometry shader thread to cause a flush of the occluder node cache via insertion of a cache flush billboard quad.

17. The system on a chip integrated circuit as in claim 13, wherein the occluder node data is associated with adaptive volumetric shadow mapping logic or adaptive transparency logic.

18. A graphics processing system comprising:

a system on a chip integrated circuit including a first processor to execute a particle rendering system and a second processor including graphics execution resources to execute one or more shader programs associated with the particle rendering system, wherein multiple threads of the one or more shader programs to deterministically insert occluder node data into an occluder node cache on the second processor and flush the occluder node cache to compress cached occluder node data; and a display device coupled to a display engine on the system on a chip integrate circuit, the display device to display pixel data generated by the one or more shader programs associated with the particle rendering system.

19. The graphics processing system as in claim 18, the particle rendering system to cause the multiple threads of the one or more shader programs to flush of the occluder node cache via insertion of a cache flush billboard quad.

20. The graphics processing system as in claim 18, the multiple threads of the one or more shader programs including at least one geometry shader thread to cause a flush of the occluder node cache via insertion of a cache flush billboard quad.

* * * * *